ID 1999

United States Patent [19]
Ueda et al.

[11] Patent Number: 5,943,795
[45] Date of Patent: Aug. 31, 1999

[54] BICYCLE SHOE

[75] Inventors: Yutaka Ueda, Tondabayashi; Yuji Nakashima, Sakai, both of Japan

[73] Assignee: Shimano Inc., Osaka, Japan

[21] Appl. No.: 09/121,664

[22] Filed: Jul. 23, 1998

Related U.S. Application Data

[60] Division of application No. 08/908,967, Aug. 8, 1997, Pat. No. 5,878,514, which is a continuation-in-part of application No. 08/704,015, Aug. 26, 1996, Pat. No. 5,727,429.

[51] Int. Cl.$^6$ ............................................. A43B 5/00
[52] U.S. Cl. ............................................. 36/131
[58] Field of Search ................................. 36/131

[56] References Cited

U.S. PATENT DOCUMENTS

| | | | |
|---|---|---|---|
| 4,377,952 | 3/1983 | Gamondes | 36/131 |
| 4,506,463 | 3/1985 | Chassaing | 36/131 |
| 4,523,492 | 6/1985 | Shimano | 74/594.4 |
| 4,646,586 | 3/1987 | Rapisarda | 74/594.6 |
| 4,686,867 | 8/1987 | Bernard et al. | 74/594.6 |
| 4,762,019 | 8/1988 | Beyl | 74/594.6 |
| 4,807,368 | 2/1989 | Beyl | 33/3 B |
| 4,815,222 | 3/1989 | Eisenbach et al. | 36/131 |
| 4,827,797 | 5/1989 | Le Faou et al. | 74/594.6 |
| 4,838,115 | 6/1989 | Nagano | 74/594.4 |
| 4,840,085 | 6/1989 | Nagano | 74/594.4 |
| 4,882,946 | 11/1989 | Beyl | 74/594.6 |
| 4,928,549 | 5/1990 | Nagano | 74/594.6 |
| 5,003,841 | 4/1991 | Nagano | 74/594.4 |
| 5,060,537 | 10/1991 | Nagano | 74/594.6 |
| 5,115,692 | 5/1992 | Nagano | 74/594.4 |
| 5,125,173 | 6/1992 | Nagano et al. | 36/131 |
| 5,131,291 | 7/1992 | Beyl | 74/594.6 |
| 5,195,397 | 3/1993 | Nagano | 74/594.4 |
| 5,282,325 | 2/1994 | Beyl | 36/27 |
| 5,379,665 | 1/1995 | Nagano | 74/594.4 |
| 5,417,128 | 5/1995 | Beyl | 74/594.6 |
| 5,419,218 | 5/1995 | Romano | 74/594.6 |
| 5,423,233 | 6/1995 | Peyre et al. | 74/594.6 |
| 5,497,680 | 3/1996 | Nagano | 74/594.6 |
| 5,505,111 | 4/1996 | Nagano | 74/594.6 |
| 5,522,282 | 6/1996 | Nagano | 74/594.6 |
| 5,685,093 | 11/1997 | Lin | 36/131 |
| 5,727,429 | 3/1998 | Ueda | 74/594.6 |

FOREIGN PATENT DOCUMENTS

| | | | |
|---|---|---|---|
| 2405037 | 4/1979 | France | 36/131 |
| 2442175 | 6/1980 | France . | |
| 3135345 | 3/1983 | Germany | 36/131 |
| 3831040 | 3/1989 | Germany . | |
| 3153426 | 10/1992 | Germany . | |
| 3157285 | 7/1991 | Japan . | |
| 5111402 | 5/1993 | Japan . | |

OTHER PUBLICATIONS

Performance Bicycle; pp. 25–28; Summer 1997.

*Primary Examiner*—M. D. Patterson
*Attorney, Agent, or Firm*—Shinjyu Global IP Counselors, LLP

[57] ABSTRACT

A bicycle shoe is disclosed for use with a clipless pedal. The bicycle shoe has an upper peripheral portion with a sole portion coupled thereto and an inner sole portion or cushion overlying the inner surface of the sole portion. The bicycle shoe can either be designed for use with a road bicycle or a mountain bicycle. In other words, the sole portion can be either a substantially hard, rigid member or a substantially flexible, resilient member. In either case, the sole is provided with one or more attachment apertures for attaching a low profile cleat thereto. In particular, the attachment aperture or apertures are longitudinally arranged such that the fasteners which couple the cleat to the shoe sole portion is located in front of and behind the pedal shaft. Preferably, the attachment aperture or apertures is spaced from a center line extending between the center points of the toe portion and the heel portion of the sole. In one embodiment, a pair of elongated slots which are axially aligned are used to attached a low profile cleat. In another embodiment, a single elongated slot is utilized to couple the low profile cleat to the bottom outer surface of the sole portion. The sole portion of the bicycle shoe can also be provided with one or more additional slots for coupling other standard cleats which are known in the prior art.

19 Claims, 27 Drawing Sheets

BICYCLE SHOE

CONTINUATION APPLICATION

This application is a divisional application of U.S. patent application Ser. No. 08/908,967, filed on Aug. 8, 1997 U.S. Pat. No. 5,878,514 and entitled Bicycle Shoes", which in turn is a continuation-in-part application of U.S. patent application Ser. No. 08/704,015, filed on Aug. 26, 1996 U.S. Pat. No. 5,727,429 and entitled "Low Profile Bicycle Pedal and Cleat Assembly." The entire disclosure of this co-pending application is hereby incorporated herein by reference.

FIELD OF THE INVENTION

The present invention generally relates to bicycle shoes for clipless pedals. More specifically, the present invention is related to a bicycle shoe with a cleat fixedly coupled to the sole of the bicycle shoe.

BACKGROUND OF THE INVENTION

In recent years, bicycle pedals have been designed for specific purposes such as for pleasure, off road biking, road racing, etc. One particular type of bicycle pedal which is gaining more popularity, is the step-in or clipless pedal which releasably engages a cleat secured to the sole of a cyclist's shoe. In this type of bicycle pedal, the rider steps onto the pedal and a clamping mechanism automatically grips on to the cleat secured to the bottom of the cyclist's shoe. A tension mechanism is usually provided in the pedal for adjusting the force required to release the shoe cleat from the step-in pedal.

More specifically, when attaching the cyclist's shoe to the step-in pedal through the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

When step-in pedals are used for road type bikes, the pedal is typically only provided with a single clamping assembly such that the cyclist's shoe can only be coupled to one of the two sides of the pedal. Off road or mountain type bikes, on the other hand, usually have a pair of clamping assemblies such that the cyclist's shoe can be clamped to either side of the pedal. In either case, it is desirable to design the pedal to be as compact and light weight as possible. Moreover, it is desirable to have the cyclist's foot as close as possible to the center longitudinal axis of the pedal shaft. Moreover, it is desirable to have the pedal as thin and small as possible to cut down on wind resistance and to increase the amount of rubber on the sole of the cyclist's shoe.

In view of the above, it is apparent that there exists a need for a bicycle shoe which can be used with a low profile bicycle pedal and cleat assembly, Moreover, there exists a need for a bicycle shoe which can accommodate different types of cleats. This invention addresses these needs in the art, along with other needs which will become apparent to those skilled in the art once given this disclosure.

SUMMARY OF THE INVENTION

One object of the present invention is to provide a bicycle shoe for use with low profile bicycle pedal and cleat assembly which is relatively compact.

Another object of the present invention is to provide a bicycle shoe having longitudinally spaced attachment apertures which minimizes the distance between the cyclist's foot and the center longitudinal axis of the pedal shaft.

Yet another object of the present invention is to provide a bicycle shoe which can accommodate different varieties of cleat assemblies.

These objects and advantages of the present invention can basically be attained by providing a bicycle shoe adapted to fixedly receive a cleat thereto for use with a bicycle pedal, comprising: a shoe sole portion having an inner surface facing the foot of the cyclist, an outer surface facing the pedal, a toe portion, a heel portion longitudinally spaced from the toe portion and a ball section located between the toe portion and the heel portion with first and second elongated attachment slots formed in the ball section which extend substantially parallel to each other in a substantially longitudinal direction between the toe portion and the heel portion, the first slot having a first longitudinal length and the second slot having a second longitudinal length which is longer than the first longitudinal length of the first slot, the first slot being laterally disposed relative to the second slot in the ball section with the first slot being located between first and second ends of the second slot.

These objects and advantages of the present invention can also be attained by providing a bicycle shoe adapted to fixedly receive a cleat thereto for use with a bicycle pedal, comprising: a shoe sole portion having an inner surface facing the foot of the cyclist, an outer surface facing the pedal, a toe portion, a heel portion longitudinally spaced from the toe portion and a ball section located between the toe portion and the heel portion with first and second elongated attachment slots formed in the ball section which extend substantially parallel to each other in a substantially longitudinal direction between the toe portion and the heel portion, the first slot having a first longitudinal length and the second slot having a second longitudinal length which is longer than the first longitudinal length of the first slot, the first slot being laterally disposed relative to the second slot in the ball section with the first slot being located between first and second ends of the second slot; and a cleat attachment member overlying the inner surface of the sole portion, the cleat attachment member having a first fixing portion overlying the second slot to fixedly couple the cleat to the outer surface of the sole portion.

These objects and advantages of the present invention can also be attained by providing a bicycle shoe adapted to fixedly receive a cleat thereto for use with a bicycle pedal, comprising: a shoe sole portion having an inner surface facing the foot of the cyclist, an outer surface facing the pedal, a toe portion, a heel portion longitudinally spaced from the toe portion and a ball section located between the toe portion ,nd the heel portion with first and second attachment apertures formed in the ball section which are substantially aligned in a substantially longitudinal direction between the toe portion and the heel portion, the first and second apertures having first and second longitudinal lengths which are substantially the same and first and second center points which are longitudinally spaced approximately 33.5 millimeters apart from each other.

These objects and advantages of the present invention can also be attained by providing a bicycle shoe adapted to fixedly receive a cleat thereto for use with a bicycle pedal, comprising: a shoe sole portion having an inner surface facing the foot of the cyclist, an outer surface facing the pedal, a toe portion, a heel portion longitudinally spaced from the toe portion and a ball section located between the toe portion and the heel portion with first and second attachment apertures formed in the ball section which are substantially aligned in a substantially longitudinal direction between the toe portion and the heel portion, the first and second apertures having first and second longitudinal lengths which are substantially the same and first and second center points which are longitudinally spaced approximately 33.5 millimeters apart from each other; and a cleat attachment member overlying the inner surface of the sole portion, the cleat attachment member having a fixing portion overlying the first and second apertures to fixedly couple the cleat to the outer surface of the sole portion.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
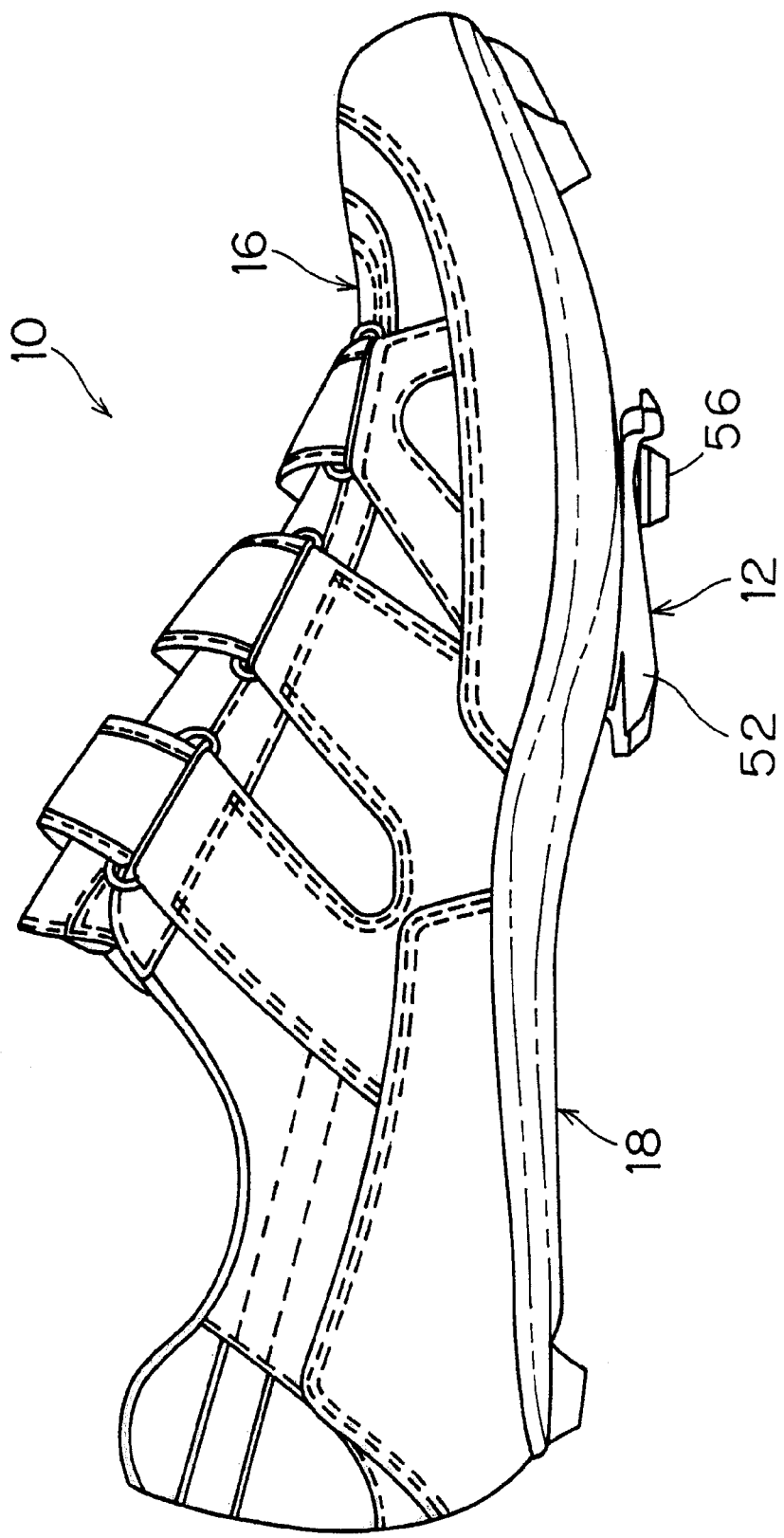
FIG. 1 is an inside elevational view of a left bicycle shoe with a cleat coupled thereto in accordance with a first embodiment of the present invention.
Figure 2:
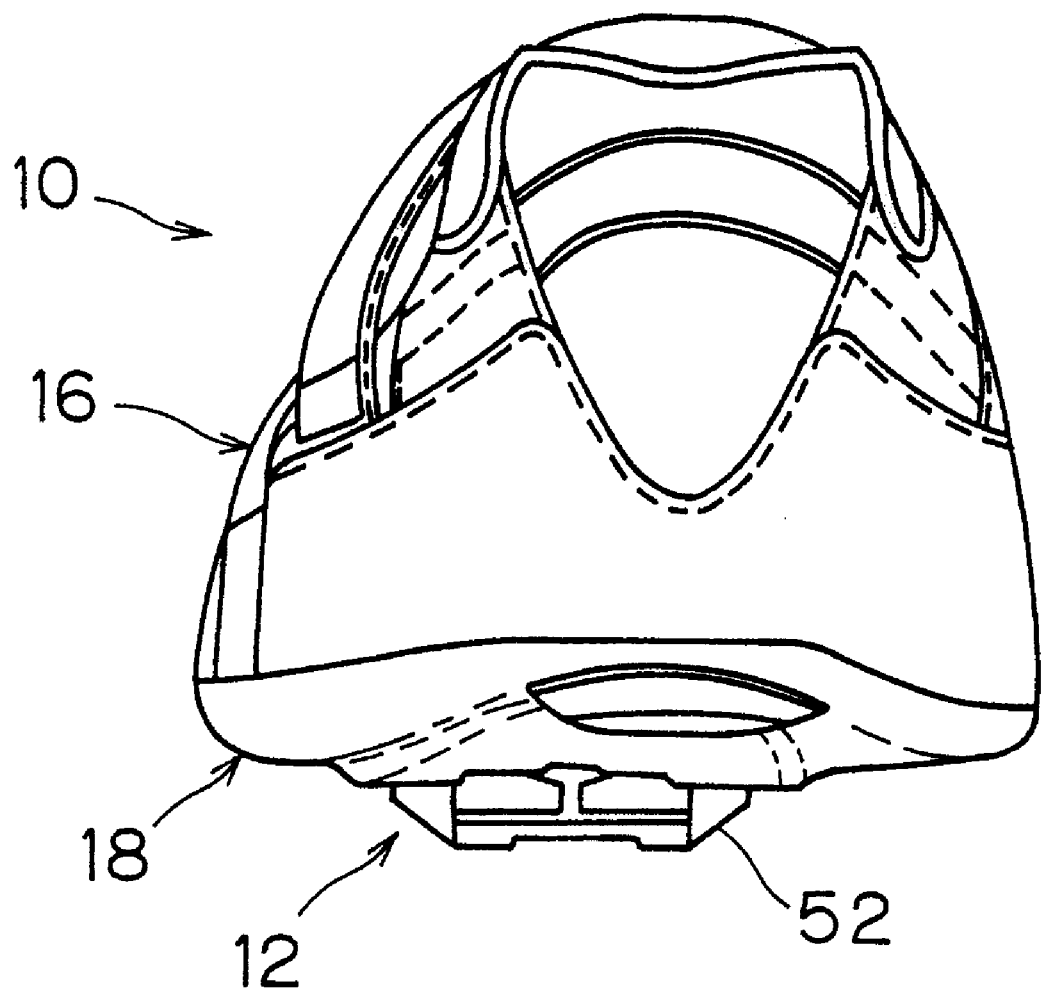
FIG. 2 is a rear elevational view of the left bicycle shoe with the cleat coupled thereto as illustrated in FIG. 1.
Figure 3:
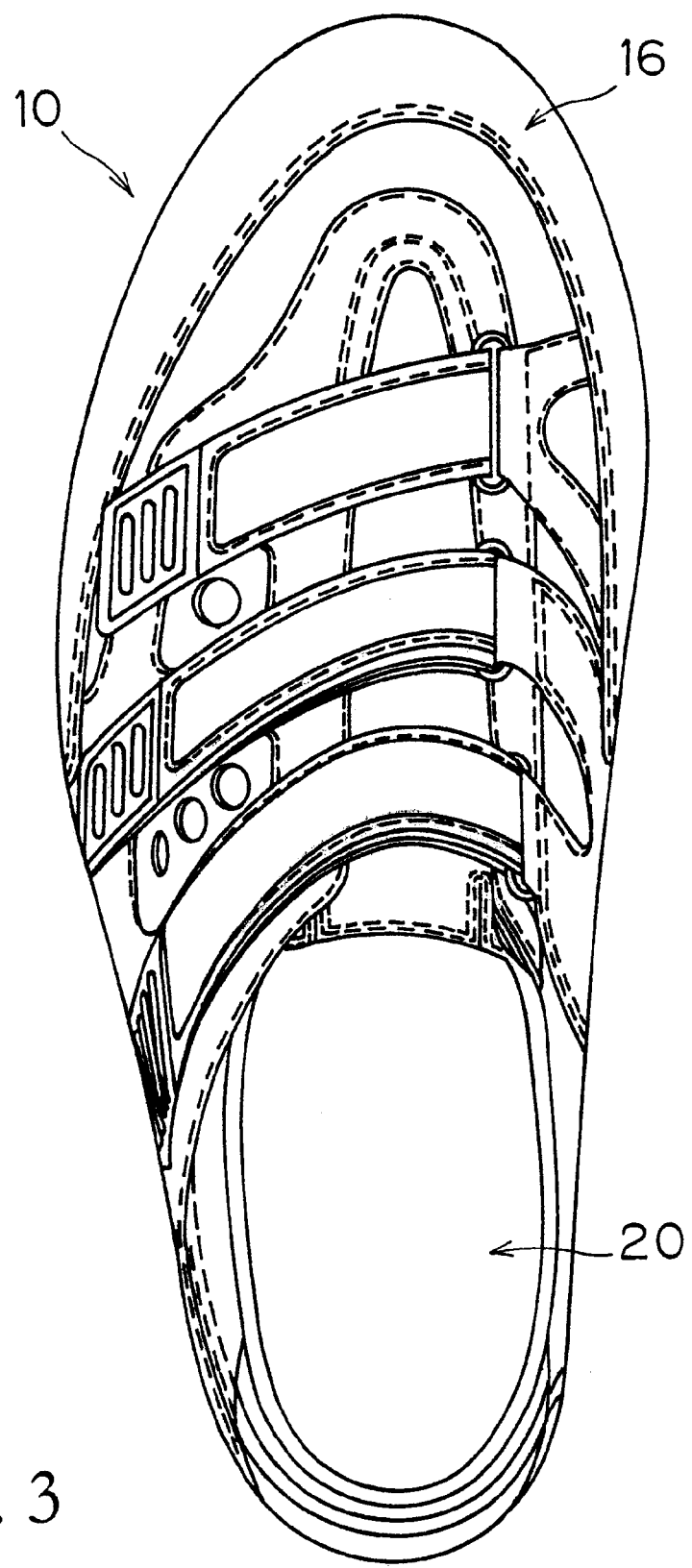
FIG. 3 is a top plan view of the left bicycle shoe illustrated in FIGS. 1 and 2.
Figure 4:
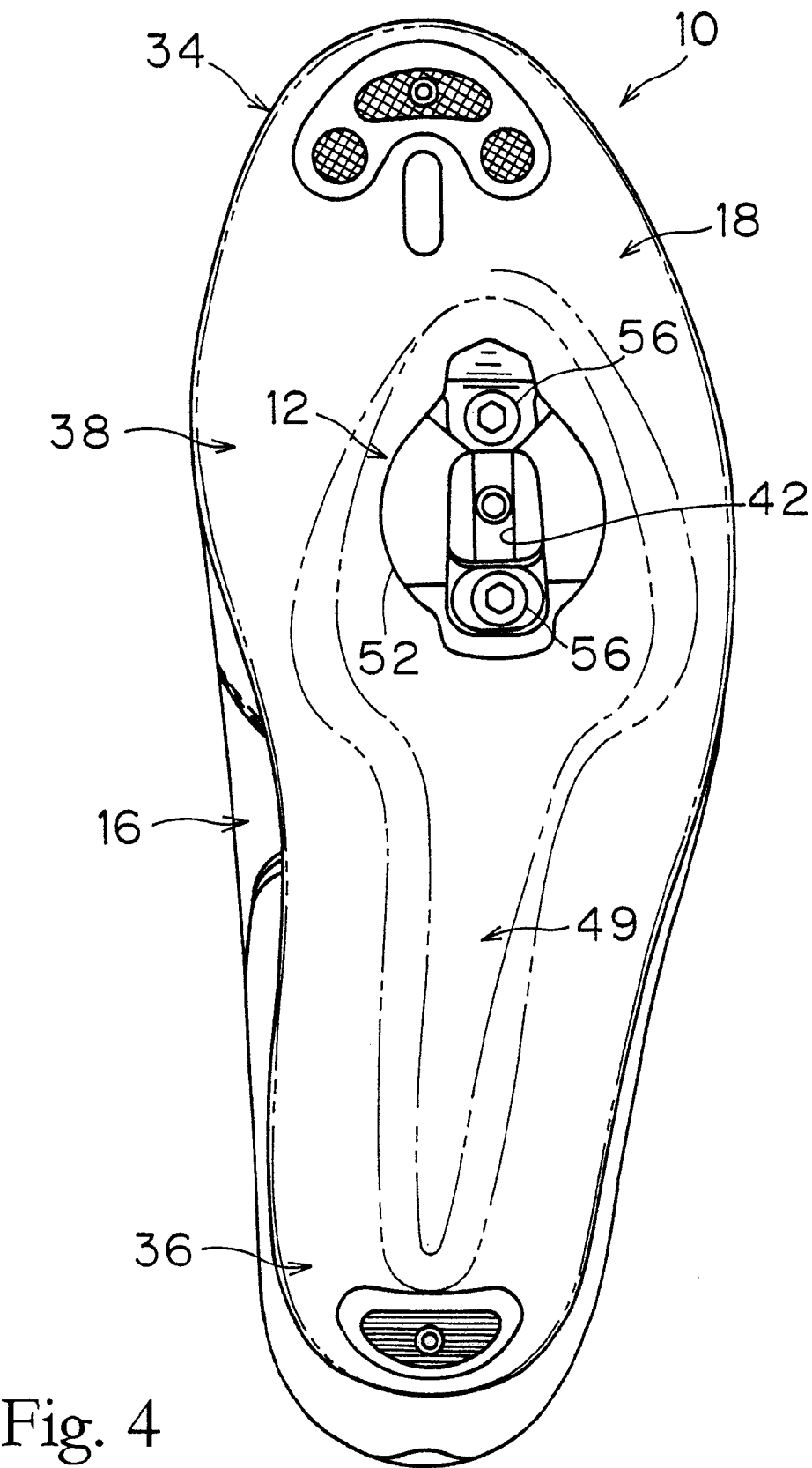
FIG. 4 is a bottom plan view of the left bicycle shoe illustrated in FIGS. 1–3, with the cleat coupled thereto.
Figure 5:
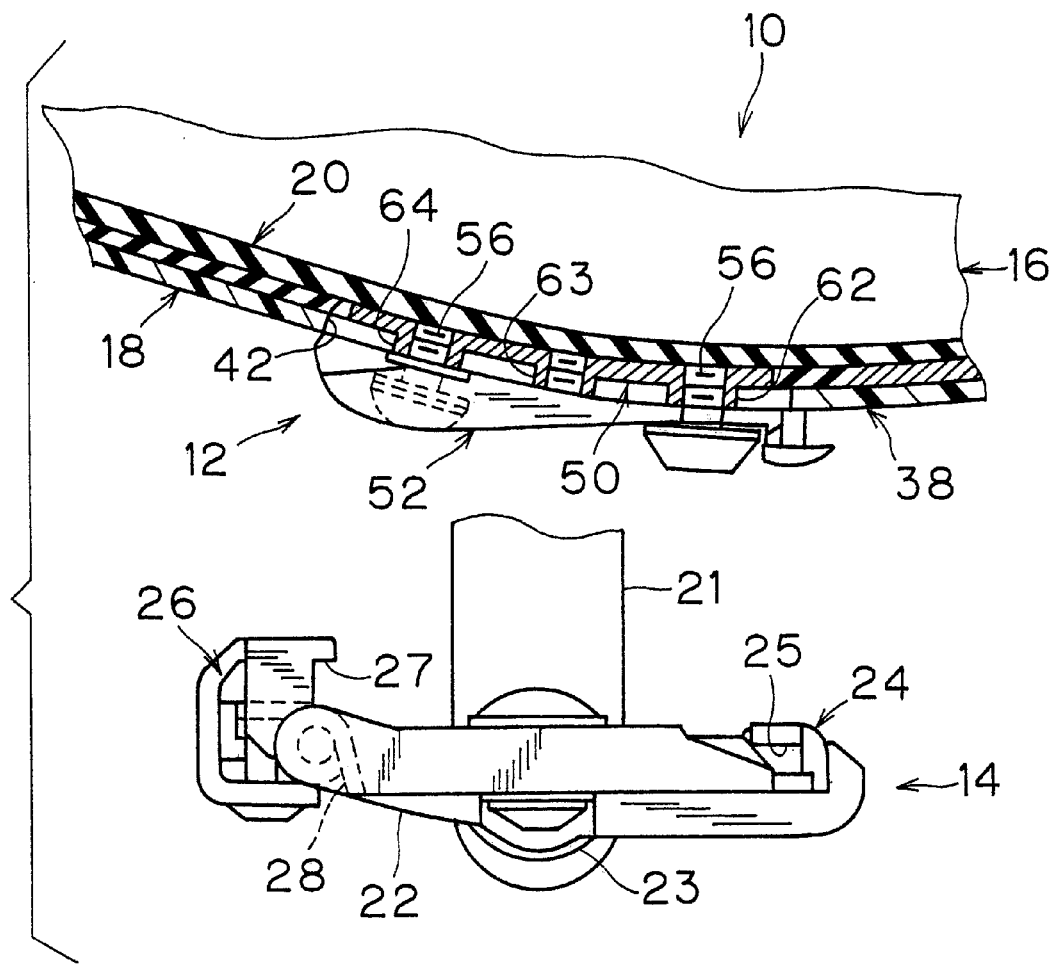
FIG. 5 is a partially, exploded outside elevational view of a low profile bicycle pedal and cleat assembly coupled to the right bicycle shoe in accordance with the first embodiment of the present invention.
Figure 6:
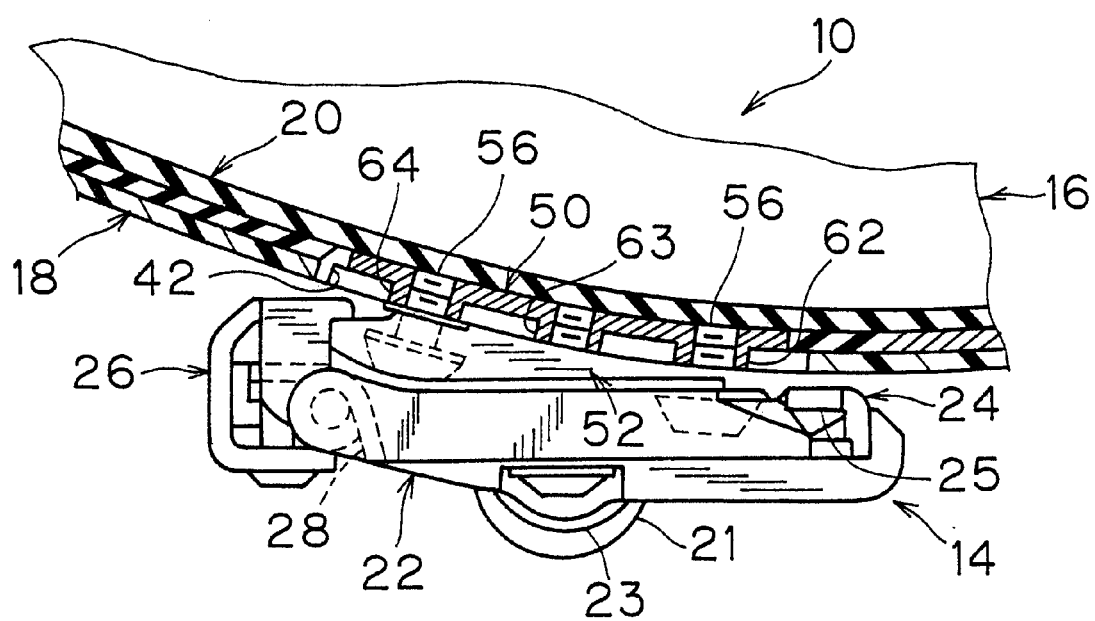
FIG. 6 is an outside elevational view of the bicycle shoe with the low profile bicycle pedal and cleat assembly illustrated in FIG. 5, after the cleat has been clipped into the bicycle pedal.
Figure 7:
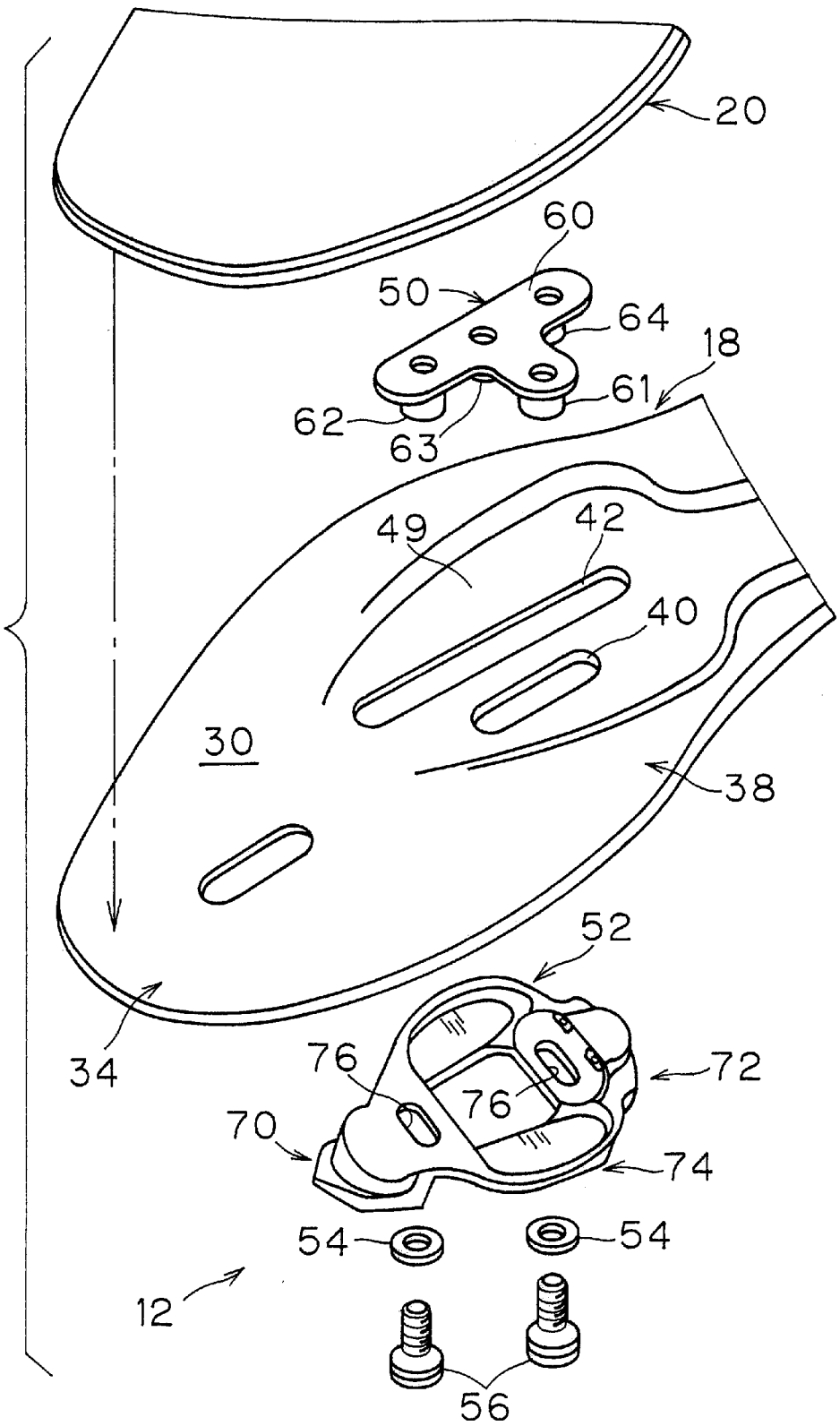
FIG. 7 is a partial, exploded perspective view of the sole portion of the right bicycle shoe and cleat assembly in accordance with the first embodiment of the present invention.

Referring initially to FIGS. 1–6, a bicycle shoe 10 in accordance with a first embodiment is illustrated with a cleat assembly 12 coupled thereto. Basically, bicycle shoe 10 and cleat assembly 12 is designed to be used with clipless pedals such as the low profile bicycle pedal 14 shown in FIGS. 5 and 6. Bicycle shoe 10 as illustrated in FIGS. 1–4 is a left bicycle shoe, while a portion of a right bicycle shoe 10 is illustrated in FIGS. 5–7. Of course, the right bicycle shoe would be substantially identical to the left bicycle shoe illustrated in FIGS. 1–4, but substantially a mirror image thereof. Therefore, bicycle shoe 10 as used herein refers to either a left bicycle shoe or a right bicycle shoe, and the drawings and description used herein will not differentiate therebetween.

Basically, bicycle shoe 10 has an upper peripheral portion 16, a shoe sole portion 18 fixedly coupled to upper peripheral portion 16 and an inner sole or cushion 20 overlying shoe ;sole portion 18. The precise construction of upper peripheral portion 16, shoe sole portion 18 and inner sole 20 will not be discussed or illustrated in detail herein, since the basic construction of a bicycle shoe is old and well-known in the prior art. Moreover, it should be apparent to those skilled in the art that the present invention should not be limited to the precise construction of the non-claimed portion of bicycle shoe 10 as discussed and illustrated herein.

Bicycle shoe 10 with cleat assembly 12 coupled thereto is releasably coupled to bicycle pedal 14. Pedal 14 basically includes a pedal body 22 for supporting a cyclist's foot, a pedal shaft 23 rotatably coupling pedal body 22 to crank arm 21, a front clamping member 24 fixedly coupled to pedal body 22 and a rear clamping member 26 pivotally coupled to pedal body 22. A biasing member or torsion spring 28 is coupled between pedal body 22 and rear clamping member 26 to bias rear clamping member 26 from a cleat releasing position to a cleat engaging position. Pedal body 22 can also be provided with a gap adjusting mechanism which is described in co-pending U.S. patent application Ser. No. 08/704,015, filed on Aug. 26, 1996. This co-pending patent application is incorporated herein by reference to further explain the gap adjusting mechanism as well as to further understand the structure and functions of pedal 14.

Upper peripheral portion 16 is adapted to receive a foot of a cyclist, and is fixedly secured, to shoe sole portion 18. Upper peripheral portion 16 is preferably constructed of conventional materials which are well-known in the bicycle art. For example, the major portions of upper peripheral portion 16 can be constructed of a flexible material such as leather or nylon or the like.

Figure 8:
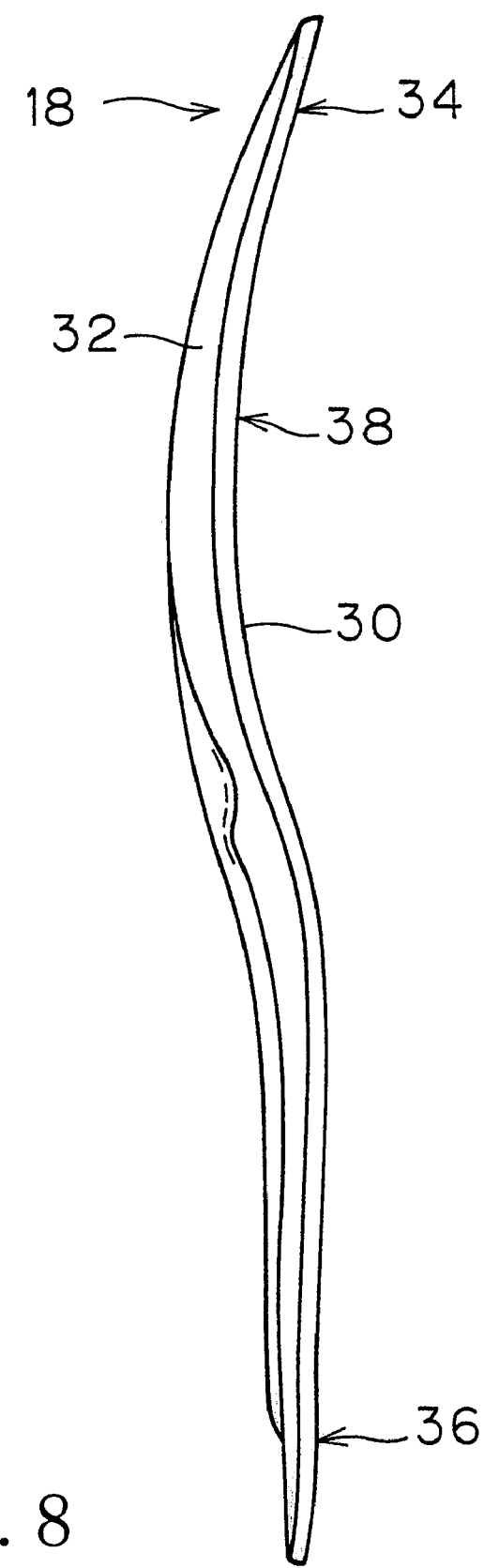
FIG. 8 is an inside elevational view of the sole portion for the right bicycle shoe in accordance with the first embodiment of the present invention as illustrated in FIGS. 1–7.
Figure 9:
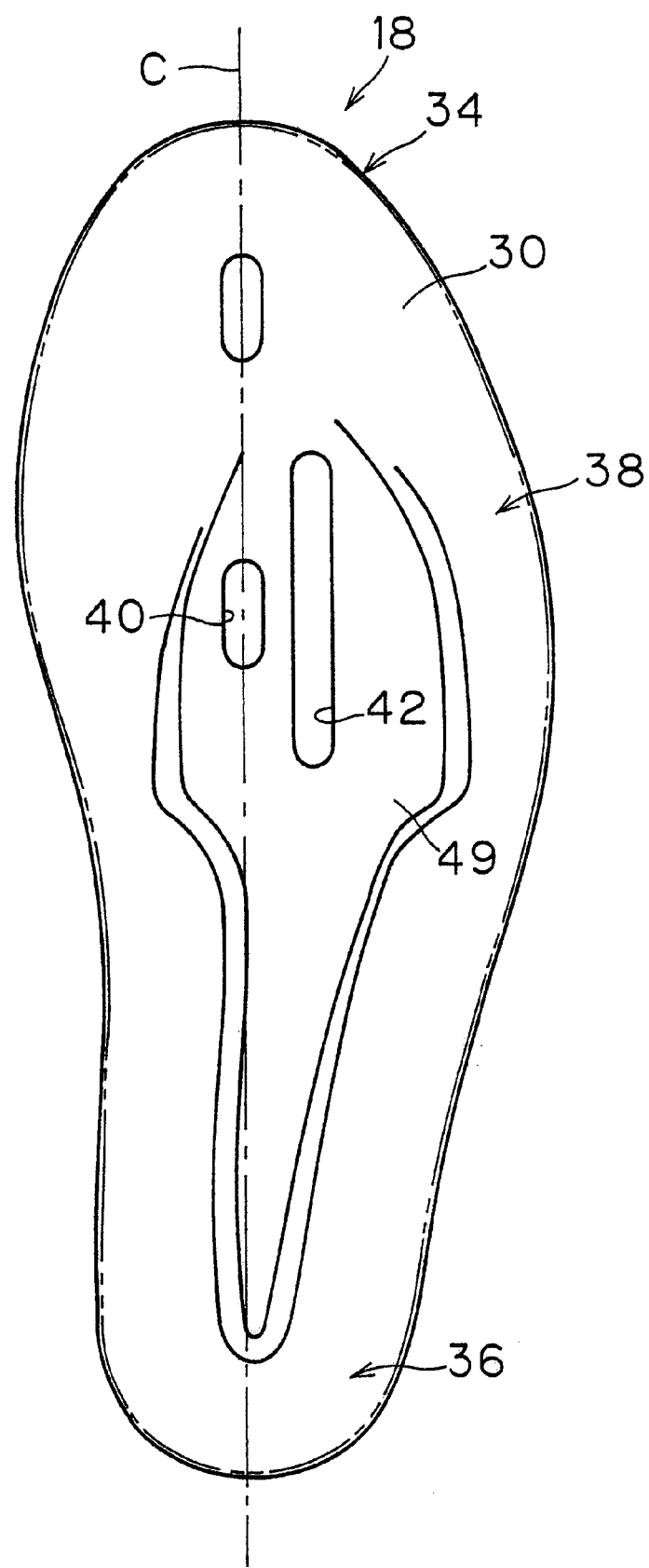
FIG. 9 is a top plan view of the inner surface of the sole portion for the right bicycle shoe in accordance with the first embodiment of the present invention as illustrated in FIGS. 1–7.
Figure 10:
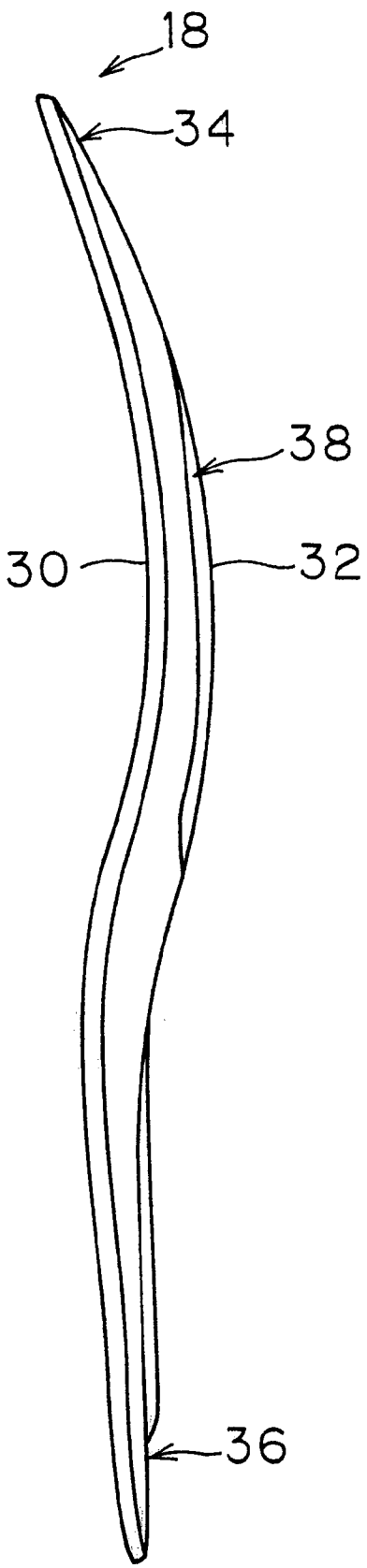
FIG. 10 is an outside elevational view of the sole portion for the right bicycle shoe in accordance with the first embodiment of the present invention as illustrated in FIGS. 1–7.
Figure 11:
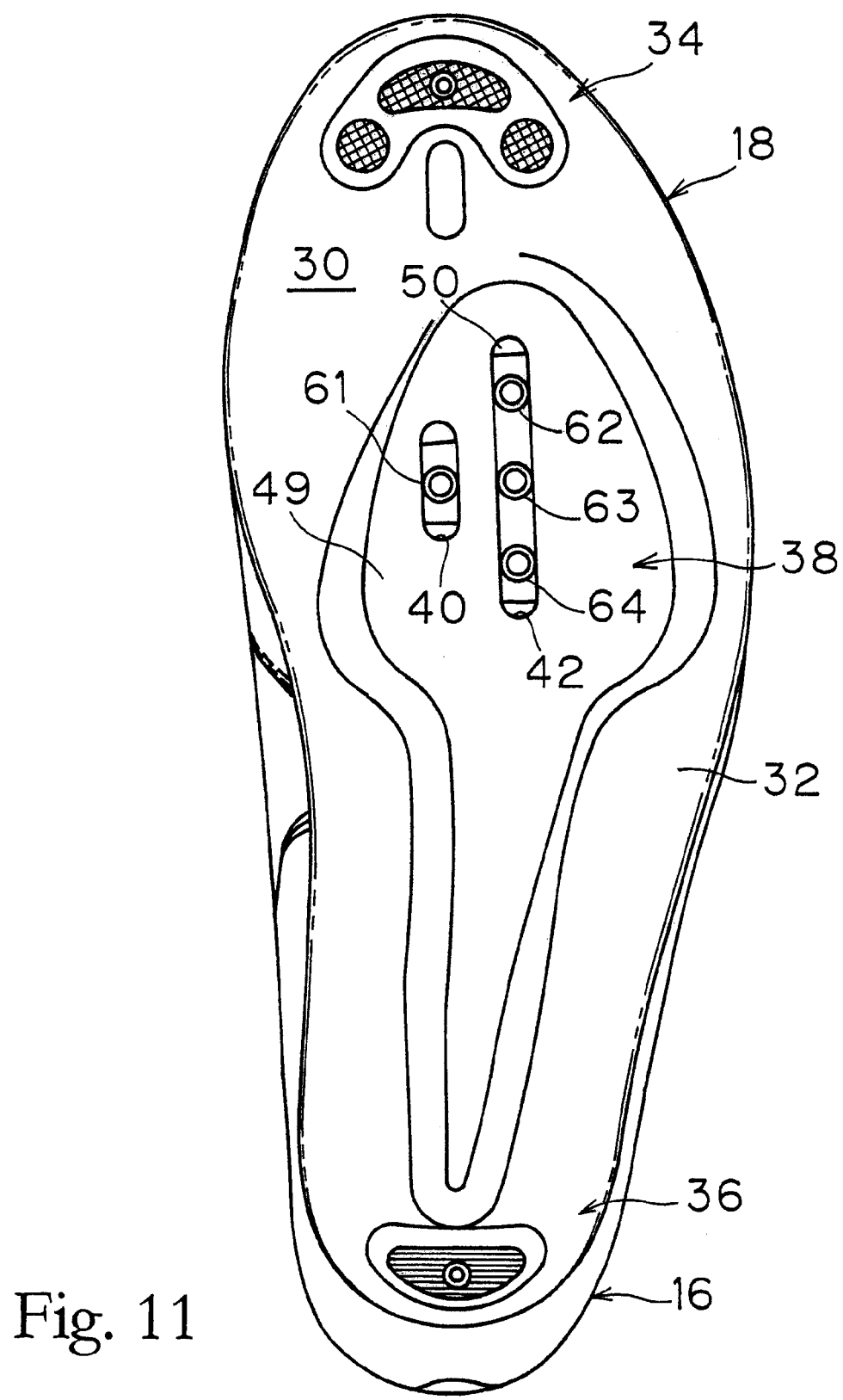
FIG. 11 is a bottom plan view of the sole portion of the bicycle shoe illustrated in FIGS. 1–7, with the cleat assembly removed from the sole portion for purposes of illustration.

As best seen in FIGS. 8–10, shoe sole portion 18 has an inner surface 30, an outer surface 32, a toe portion 34, a heel portion 36 and a ball section 38. Preferably, shoe sole portion 18 is constructed of any conventional shoe sole material which is known to be used in making bicycle shoes. In the first embodiment, bicycle shoe 18 is illustrated as a road bike shoe. Thus, shoe sole portion 18, in this embodiment, is constructed of a substantially hard, rigid material such as a carbon graphite composite. Of course, it will be apparent to those skilled in the art from this disclosure that shoe sole portion 18 could be constructed of a more flexible material.

Inner surface 30 of sole portion 18 faces upwardly towards the foot of the cyclist and has inner sole 20, which can be one or more layers, overlying inner surface 30. Outer surface 32 of sole portion 18 faces downwardly for engaging pedal 14 via cleat assembly 12. Inner and outer surfaces 30 and 32 of shoe sole portion 18 has a typical outer peripheral shoe sole shape which basically conforms to the outer shape of a cyclist's foot. Moreover, sole portion 18 is a concaved contour as viewed from inner surface 30, with a further depression 49 formed longitudinally therealong.

Sole portion 18 has a longitudinally extending center line C which extends from a first center point of toe portion 34 to a second center point of heel portion 36. In other words, center line C substantially bisects the front curve of toe portion 34 and substantially bisects the rear curve of heel portion 36.

In this first embodiment, shoe sole portion 18 is provided with a pair of longitudinally extending attachment apertures 40 and 42 for coupling cleat assembly 12 thereto as seen in FIGS. 1, 2, 4 and 5–10. Of course, it will be apparent to those skilled in the art from this disclosure that first and second attachment apertures 40 and 42 could be combined as one single attachment aperture having either a generally T-shaped or a generally H-shaped configuration. Moreover, it will be apparent to those skilled in the art from this disclosure that attachment apertures 40 and 42 could be constructed of a plurality of holes for accommodating cleat assembly 12.

In the first embodiment, first attachment aperture 40 is a longitudinally extending slot which lies on the center line C of bicycle shoe 10. Second attachment aperture 42 is spaced laterally from first attachment aperture 40 and extends substantially parallel thereto. More specifically, second attachment aperture 42 is spaced laterally towards the outside edge of bicycle shoe 10, and is in the form of an elongated slot which is parallel to first attachment aperture or elongated slot 40, but longer in length. In particular, first attachment aperture or slot 40 has a first longitudinal length and second attachment aperture or slot 42 has a second longitudinal length which is longer than the first longitudinal length of first attachment aperture or slot 40. For example in the preferred embodiment, first attachment apertuce extends approximately 21.3 millimeters in longitudinal length and second attachment aperture 42 extends approximately 56.9 millimeters in length.

The first attachment aperture or slot 40 is laterally disposed relative to second attachment aperture or slot 42 in ball section 38 with first attachment aperture or slot 40 being located between first and second ends of the second attachment aperture or slot 42. Preferably, attachment apertures or slots 40 and 42 have substantially the same transverse width with their longitudinal axes being spaced approximately 14.0 millimeters apart from each other. Preferably, attachment apertures or slots 40 and 42 have first and second center points which are longitudinally spaced approximately 32.0 millimeters to approximately 34.0 millimeter, (preferably approximately 33.5 millimeters) apart from each other. Also, second attachment aperture 42, preferably, has its center line spaced approximately 12.0 millimeters from the longitudinal center line C of bicycle shoe 10.

As seen in FIG. 7, cleat assembly 12 basically includes a cleat attachment plate or member 50, a cleat 52, a pair of washers 54 and a pair of threaded fasteners or screws 56. Cleat assembly 12 is basically fixedly coupled to shoe sole portion 18 such that cleat attachment plate or member 50 engages inner surface 30 of sole portion 18 and cleat 52 engages outer surface 32 of sole portion 18. Cleat assembly 12 is longitudinally adjustable along the ball section 38 of shoe sole portion 18.

Figure 12:
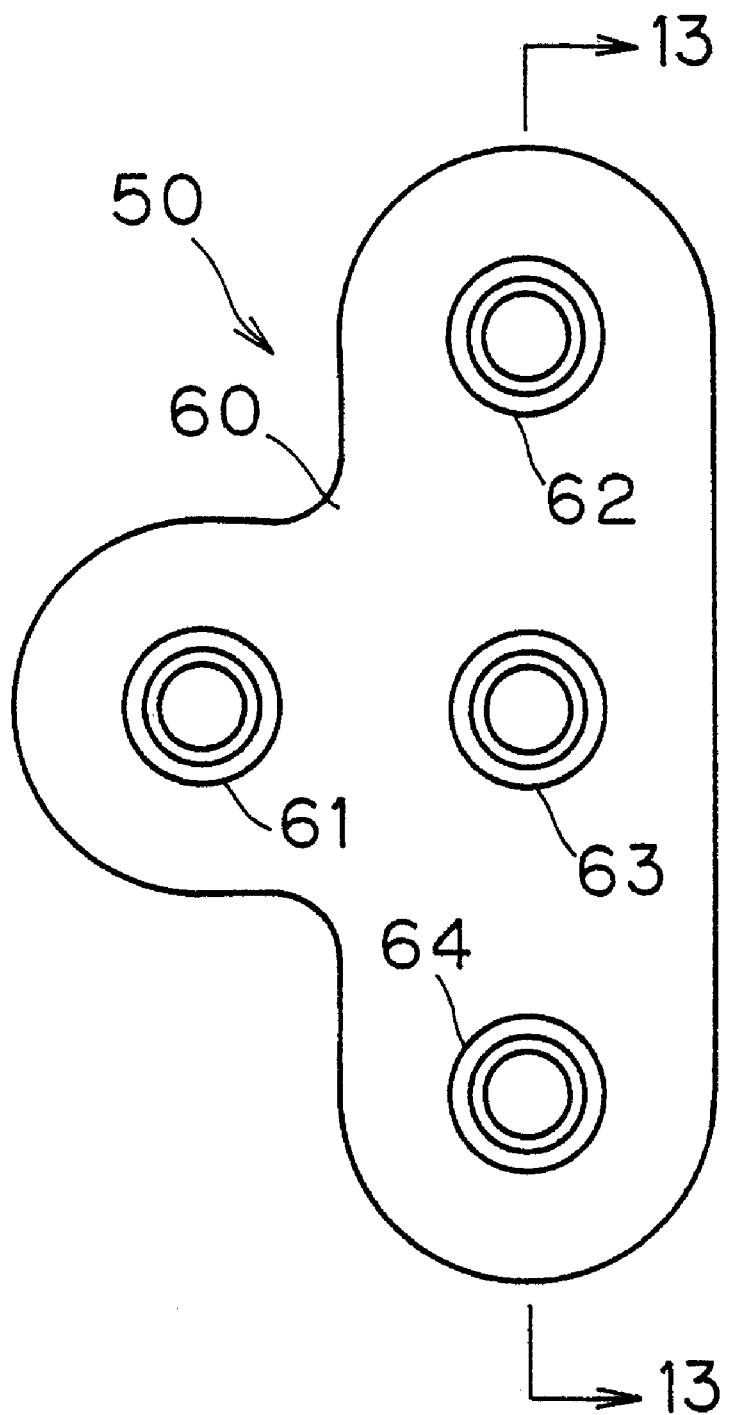
FIG. 12 is a bottom plan view of the attachment member or plate for the cleat assembly with three cleat nuts for attaching a cleat thereto.
Figure 13:
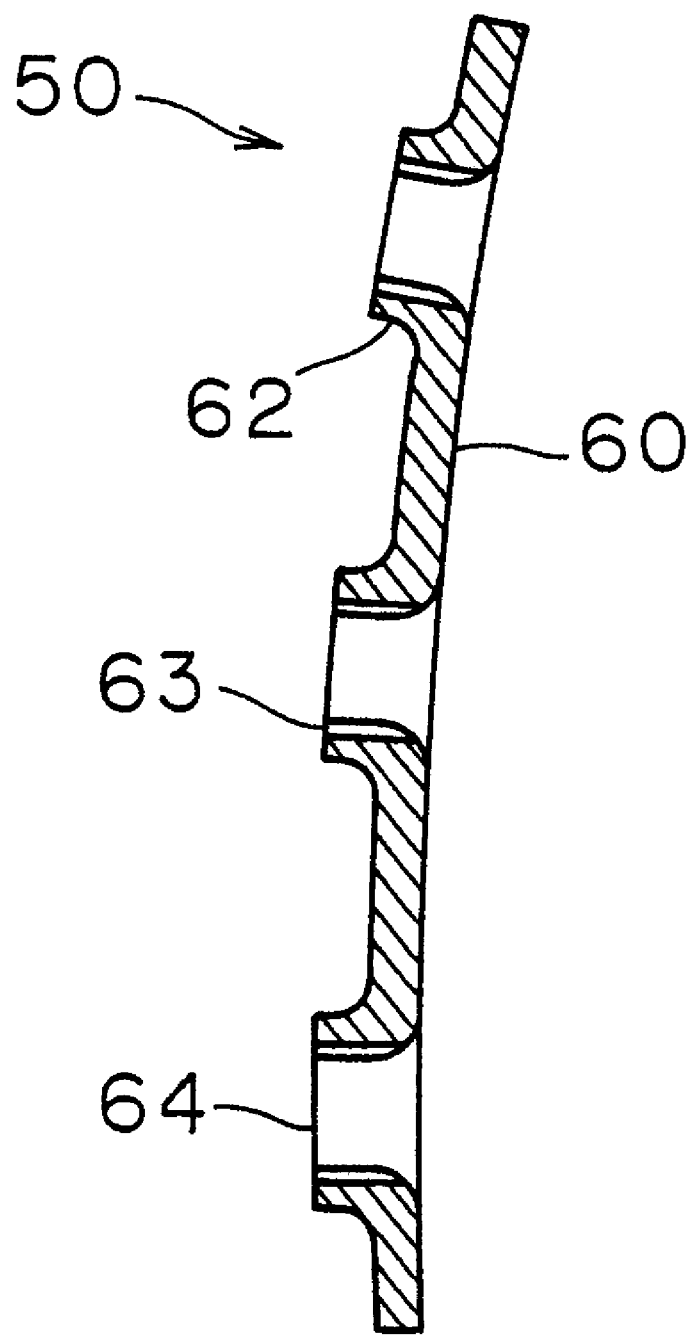
FIG. 13 is a longitudinal cross-sectional view of the attachment member illustrated in FIG. 12 as seen along section line 13—13 of FIG. 12.
Figure 14:
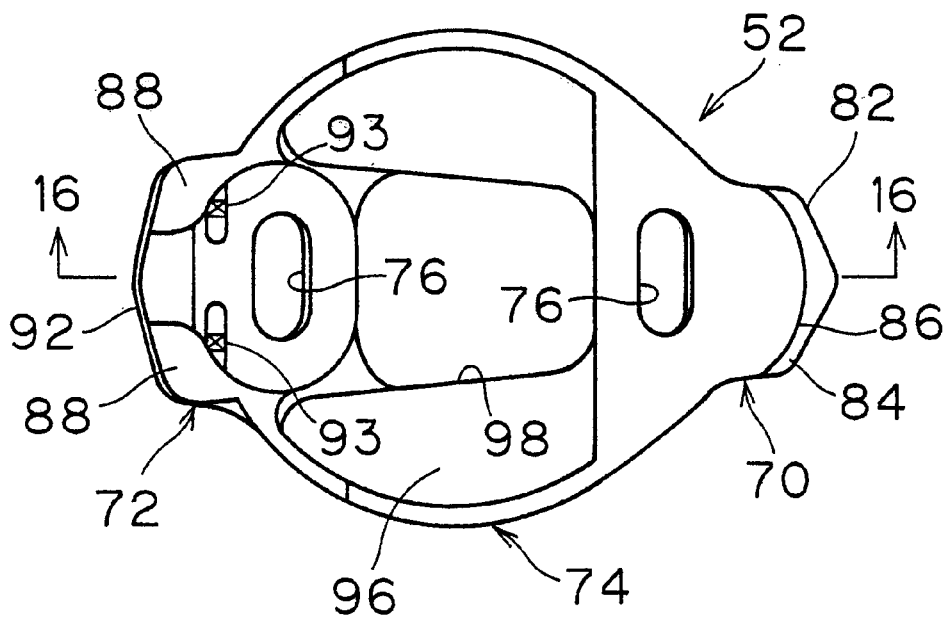
FIG. 14 is a top plan view of the cleat which is utilized in connection with the low profile bicycle pedal illustrated in FIGS. 5 and 6 and the sole portion illustrated in FIGS. 1–7 as well as with subsequent embodiments of the present invention illustrated herein.
Figure 15:
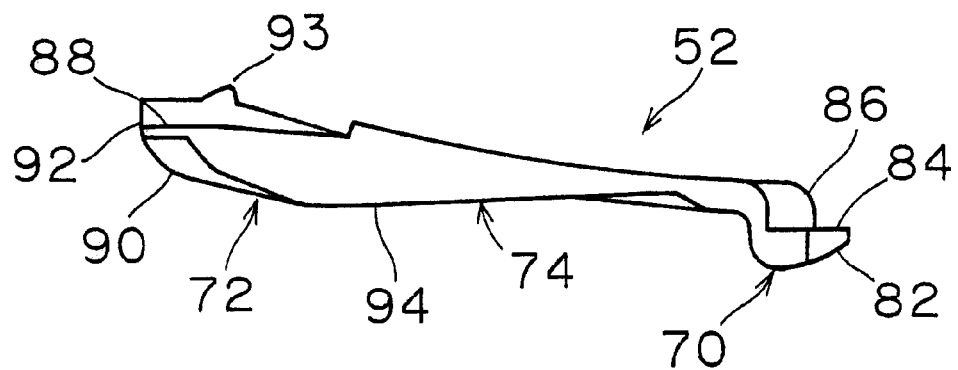
FIG. 15 is a side elevational view of the cleat illustrated in FIG. 14 for use with the bicycle shoe and pedal illustrated in FIGS. 1–7 and subsequent embodiments of the present invention illustrated herein.
Figure 16:
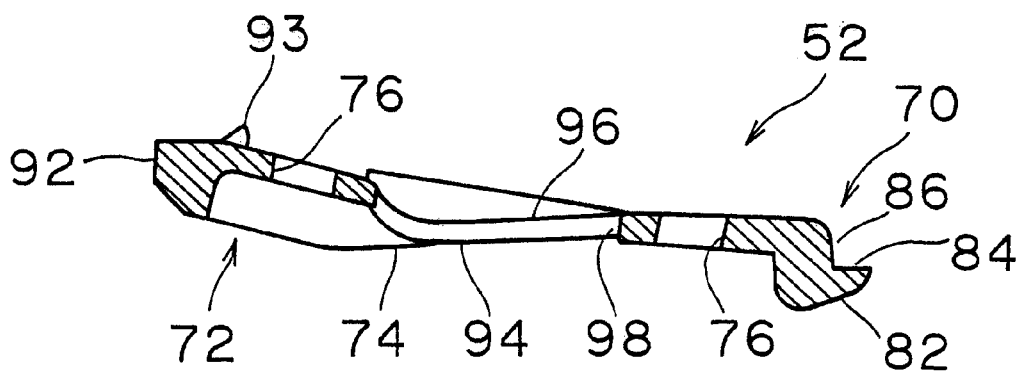
FIG. 16 is a longitudinal cross-sectional view of the cleat illustrated in FIGS. 14 and 15 as seen along section line 16—16 of FIG. 14.
Figure 17:
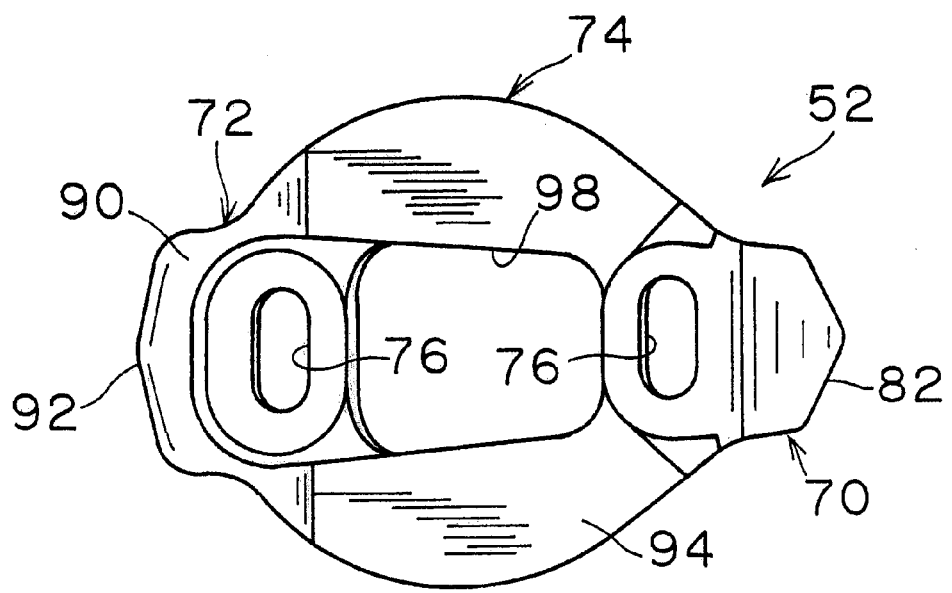
FIG. 17 is a bottom plan view of the cleat illustrated in FIGS. 14–16 for use with the bicycle shoe and pedal illustrated in FIGS. 1–7 and subsequent embodiments of the present invention illustrated herein.

As seen in FIGS. 7, 12 and 13, cleat attachment member 50 has a generally T-shaped outline and has a base portion 60 and four cleat nuts 61–64 fixedly coupled to base portion 50. Base portion 60 has a first fixing portion with cleat nuts 62–64 formed thereon and a second fixing portion with cleat nut 61 formed thereon.

Preferably, base portion 60 and cleat nuts 61–64 are constructed as a one-piece, unitary member from a suitable rigid material. For example, attachment member 50 can be constructed of a hard rigid metallic material such as those commonly used for cleat nuts known in the prior art.

As seen in FIG. 13, base portion 60 is preferably curved to match the curvature of inner surface 30 of sole portion 18. Cleat nuts 61–64 are preferably internally threaded tubes which are selectively adapted to threadedly receive fasteners 56 therein. As seen in FIG. 12, cleat nuts 62–64 are longitudinally aligned for portions thereof being received within second attachment aperture 42 of sole portion 18, while cleat nut 61 is laterally spaced from cleat nuts 62–64 such that cleat nut 61 is aligned with first attachment aperture 40 of sole portion 18 with a portion of cleat nut 61 to be received in first attachment aperture 40 of sole portion 18. Of course, cleat nuts 61–64 can be replaced with unthreaded holes such that fasteners can be threaded into the cleat 52.

Preferably, the centers of cleat nuts 61 and 63 are spaced approximately 14.0 millimeters apart such that cleat nuts 61 and 63 can be used to attach a conventional cleat such as the ones manufactured by Shimano, Inc. (see FIG. 18). The centers of cleat nuts 62 and 64 are spaced approximately 32.0 millimeters to approximately 34.0 millimeters (preferably approximately 33.5 millimeters) apart such that when cleat 52 is attached thereto by fasteners 56, the pedal shaft 23 of pedal 14 is located between cleat nuts 62 and 64. Preferably, cleat nuts 61 and 64 are spaced longitudinally from cleat nut 62 by a measurement of approximately 16.0 millimeters to approximately 16.5 millimeters as measured from the center axes of the holes of the cleat nuts 61, 62 and 64.

As seen in FIGS. 5 and 6, cleat 52 is designed to releasably couple sole portion 18 of bicycle shoe 10 to bicycle pedal 14. Specifically, cleat 52 is engaged with pedal 14 by pressing cleat 52 into pedal 14 with a forward and downward motion. This releasably locks cleat 52 to pedal 14. Cleat 52 can be released from pedal 14 by twisting the heel portion 36 of the shoe 10 to the outside of pedal 14.

Referring now to FIGS. 14–17, cleat 52 has a front attachment portion 70 for engaging front clamping member 24 of pedal 14, a rear attachment portion 72 for engaging and moving rear clamping member 26, and a center or connecting portion 74 extending between front attachment portion 70 and rear attachment portion 72. Preferably, Front and rear attachment portions 70 and 72, together with center portion 74 are integrally formed together as a one-piece, unitary member which is constructed from a suitable rigid material.

Front attachment portion 70 and rear attachment portion 72 each has a hole or slot 76 for receiving one of the fasteners 56 therethrough for coupling cleat 52 to sole portion 18 of the bicycle shoe 10 in a relatively conventional manner as seen in FIG. 7. This interconnection of cleat 52 to sole portion 18 is relatively well-known in the art, and thus, this interconnection will not be discussed or illustrated in detail herein.

As seen in FIGS. 14–17, front attachment portion 70 has a nose portion 82 for engaging front clamping member 24 of pedal 14. Nose portion 82 has a front coupling surface 84 and a curved stop surface 86 formed thereon. Front coupling surface 84 is preferably a substantially flat, planar surface which is designed to engage front cleat engaging surface 25 of front clamping member 24. Curved stop surface 86 is designed to engage a cutout portion of front clamping member 24 to prevent forward movement of cleat 54 relative to the pedal body 22. Curved stop surface 86 engages front clamping member 24 to form a pivot point for pivotally releasing cleat 52 from pedal body 22.

Rear attachment portion 72 has a pair of rear coupling surfaces 88 for engaging rear cleat engaging surface 27 of rear clamping member 26 to secure cleat 52 to pedal body 22 via rear clamping member 26. Rear coupling surfaces 88 are preferably substantially flat, planar surfaces which are substantially parallel to front coupling surface 84 of cleat 52. Rear attachment portion 72 also has a curved or angled cam surface 90 which is designed to engage rear clamping member 26 during coupling of cleat 52 to pedal body 22. In particular, cam surface 90 is designed to rotate rear clamping member 26 rearwardly from its normal cleat engaging position to its cleat releasing position during downward movement of cleat 52 relative to pedal body 22. Rear attachment portion 72 also has a curved stop surface 92 for engaging rear clamping member 26 to prevent rearward movement of cleat 52 relative to pedal body 22 when coupled thereto. Rear attachment portion 72 is also provided with a pair of upwardly extending protrusions 93 for engaging sole portion 18 to properly locate cleat 52 to sole portion 18.

Center portion 74 has a substantially planar bottom surface 94 which is designed to engage a cleat supporting surface of pedal 14. The upper surface 96 of center portion 74 is recessed relative to front and rear attachment portions 70 and 72 and has a center opening 98 therein.

In coupling cleat 52 to bicycle pedal 14, the rider steps on to the pedal body 22 which in turn causes clamping members 24 and 26 to automatically grip onto cleat 52 for securing pedal 14 to the sole portion 18 of bicycle shoe 10. More specifically, when attaching bicycle shoe 10 to step-in pedal 14 via cleat 52, the cyclist moves shoe 10 obliquely downwardly and forwardly relative to pedal body 22 such that the front end or nose portion 82 of cleat 52 engages front clamping member 24 of pedal body 22.

Once the front end of cleat 52 is engaged with front clamping member 24 of pedal body 22, the cyclist places the rear end of cleat 52 in contact with rear clamping member 26 of pedal body 22. This causes cam surface 92 to engage rear clamping member 26. In this position, the cyclist presses shoe 10 downwardly against pedal 14 to cause rear clamping member 26 to initially pivot rearwardly against the force of biasing spring 28 to pivot rear clamping member 26 to a cleat releasing position. The rear end of cleat 52 then enters a position opposite a back face of rear clamping member 26. Then, rear clamping member 26 returns under the force of biasing member or spring 28 such that rear clamping member 26 engages the rear end of cleat 52. This engagement fixes the cyclist's shoe 10 to pedal 14 via cleat 52.

When releasing the shoe from the pedal 14, the cyclist will typically turn the shoe about an axis perpendicular or approximately perpendicular to the axis of the pedal 14, using the front end or nose portion 82 of cleat 52 as a pivot point. As a result of this pivoting action, rear clamping member 26 is pivoted rearwardly against the force of the spring 28 to a cleat releasing position to release the shoe 10 with cleat 52 from pedal 14.

Figure 18:
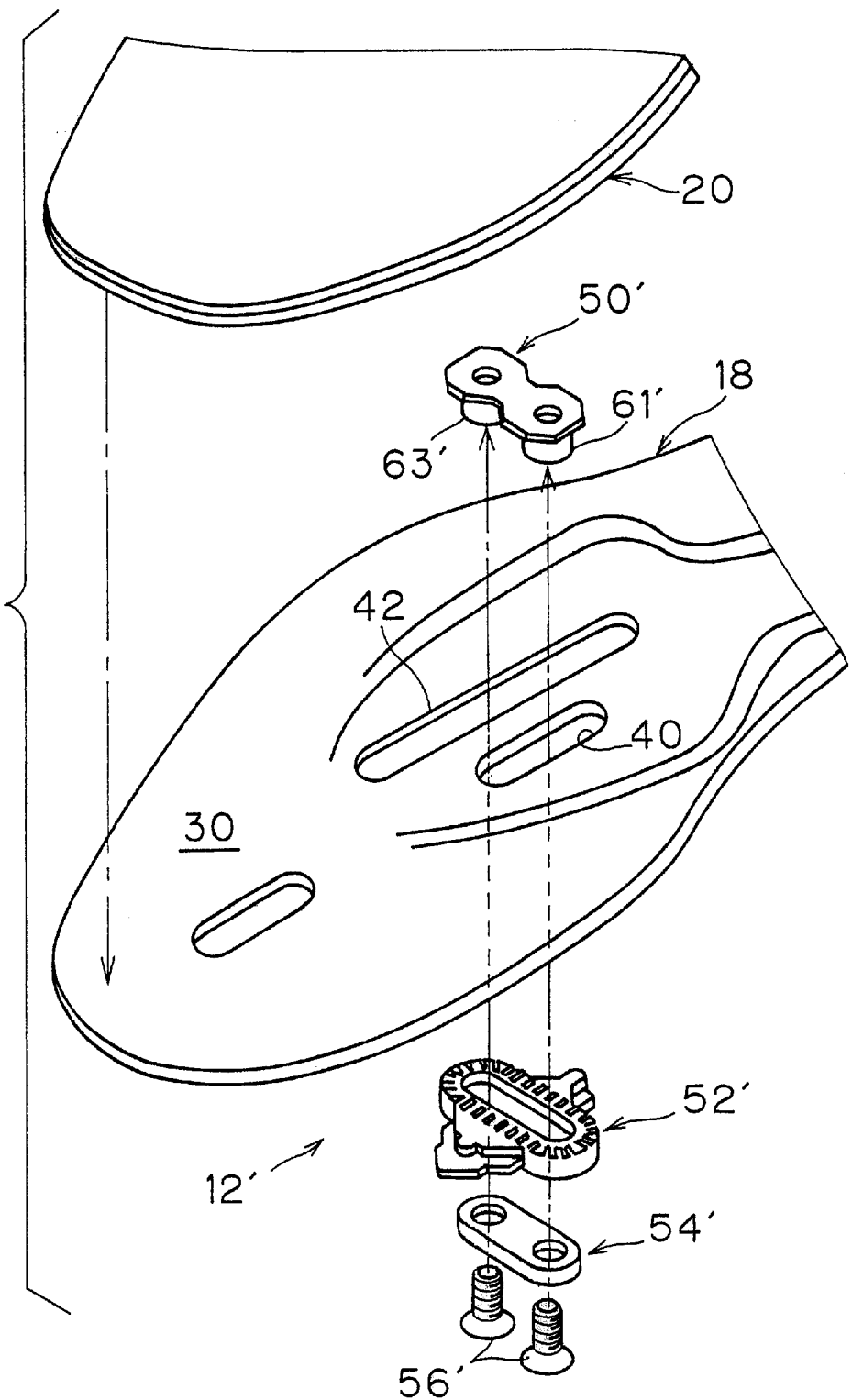
FIG. 18 is a partial, exploded perspective view of the sole portion of the bicycle shoe in accordance with the first embodiment of the present invention, but utilizing a standard cleat assembly which is currently on the market.

As seen in FIG. 18, shoe sole portion 18 can be utilized in conjunction with a conventional cleat assembly 12'. Conventional cleat assembly 12' is well-known in the prior art, and thus, will not be discussed or illustrated in detail herein. Basically, cleat assembly 12 is of the type manufactured by Shimano, Inc. for their line of SPD® shoes and pedals. More particularly, cleat assembly 12' has an attachment plate or member 50', a cleat 52', an adapter 54' and a pair of threaded fasteners or screws 56'.

Cleat assembly 12' is basically fixedly coupled to sole portion 18 such that attachment plate 50' engages inner surface 30 of sole portion 14, and cleat 52' engages outer surface 32 of sole portion 18. More specifically, cleat nuts 61' and 63' of attachment plate 50' are received in attachment apertures 40 and 42, respectively, such that attachment plate 50' mounts substantially transverse to the longitudinal axis of sole portion 18.

Second Embodiment

Figure 19:
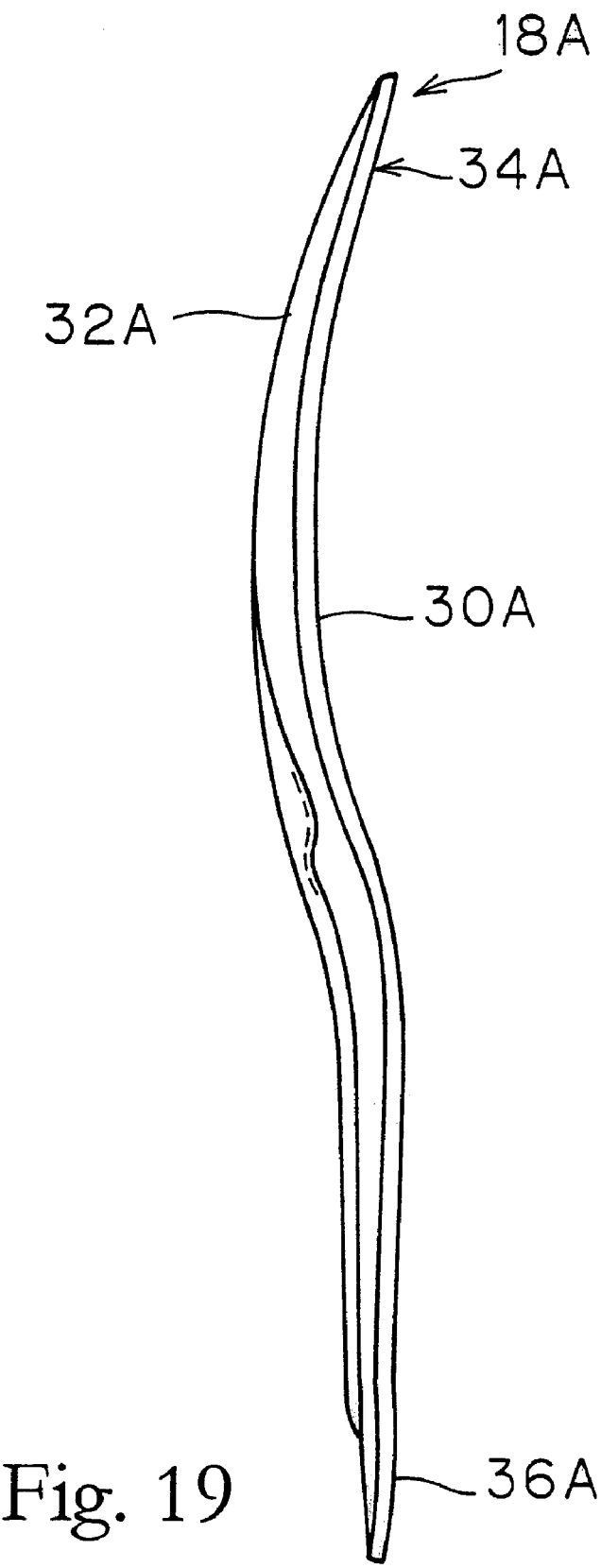
FIG. 19 is an inside elevational view of the sole portion for a right bicycle shoe in accordance with a second embodiment of the present invention.
Figure 20:
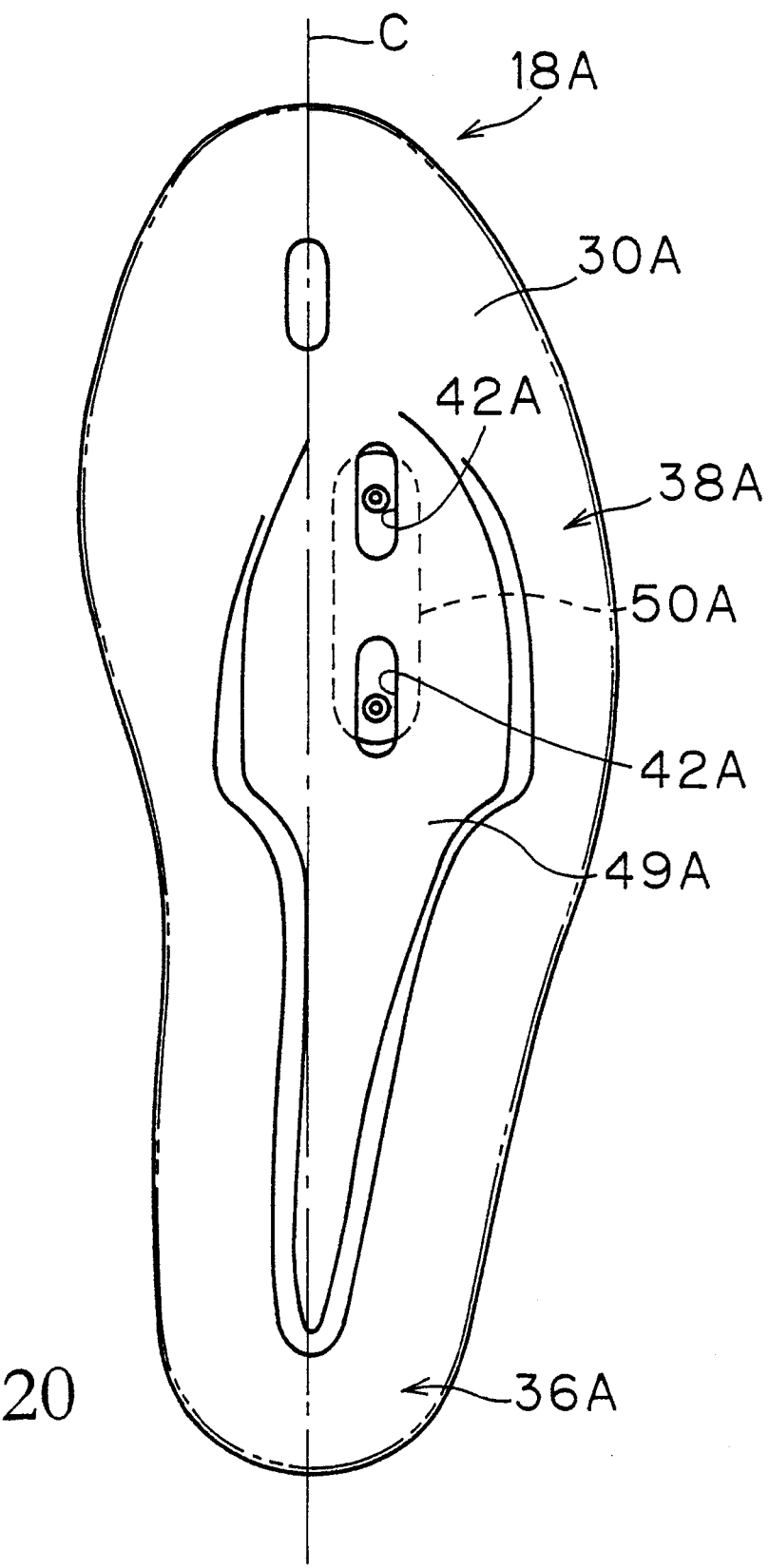
FIG. 20 is a top plan view of the inner surface, of the sole portion for the right bicycle shoe illustrated in FIG. 19 in accordance with the second embodiment of the present invention.
Figure 21:
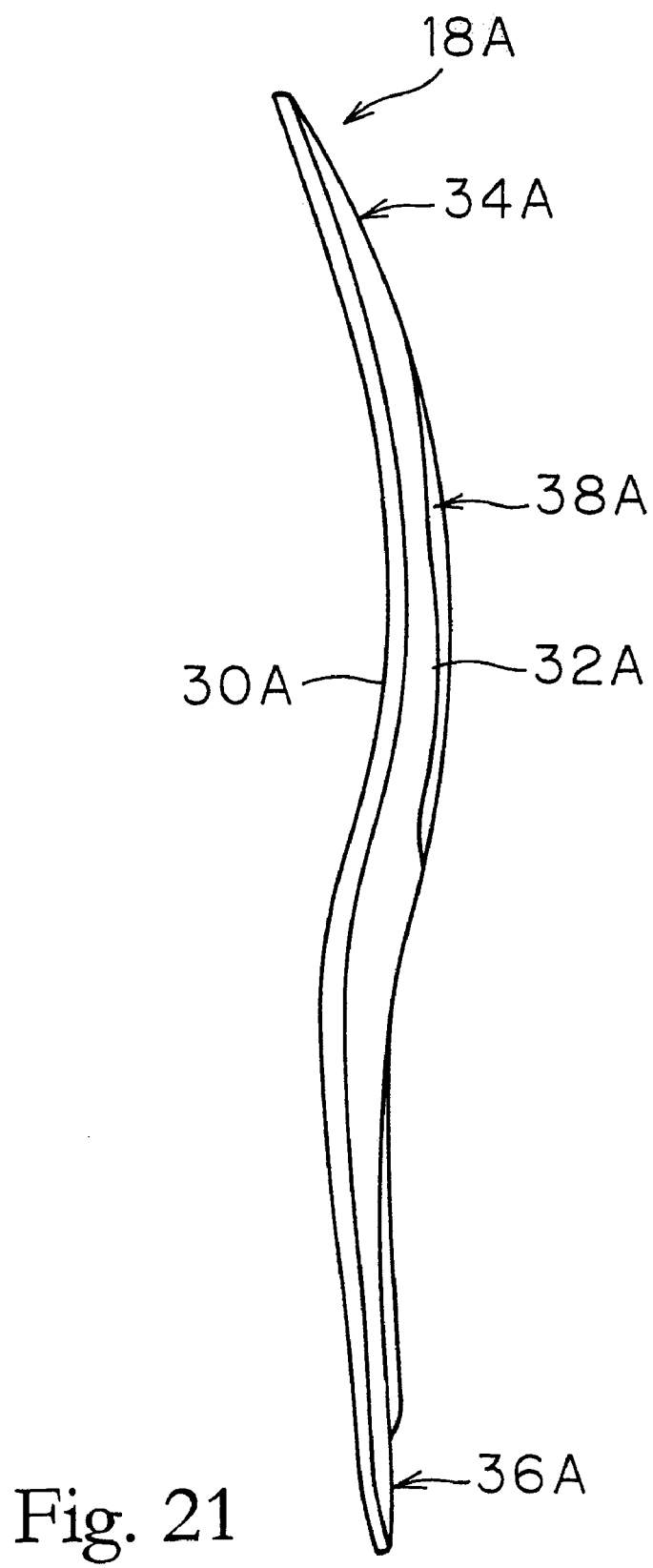
FIG. 21 is an outside elevational view of the sole portion for the right bicycle shoe in accordance with the second embodiment of the present invention as illustrated in FIGS. 19 and 20.

Referring now to FIGS. 19–21, a modified sole portion 18A is illustrated in accordance with the present invention. Sole portion 18A is substantially identical to sole portion 18, discussed above, except that sole portion 18A has a pair of attachment apertures 42A which are longitudinally aligned. In other words, attachment aperture 42 of sole portion 18 of the first embodiment has been divided into two separate attachment apertures 42A and the first attachment aperture 40 has been eliminated. Therefore, sole portion 18A will not be discussed or illustrated in detail herein.

Basically, sole portion 18A is designed to be coupled to upper peripheral portion 16 in substantially the same manner as in the first embodiment and is designed to be utilized with cleat assembly 18 in substantially the same manner as in the first embodiment. Shoe sole portion 18A has an inner surface 30A, an outer surface 32A, a toe portion 34A, a heel portion 36A and a ball section 38A. Preferably, shoe sole portion 18A is constructed of any conventional shoe sole material which is known to be used in making bicycle shoes. Shoe sole portion 18A, in this embodiment, is preferably constructed of a substantially hard, rigid material such as a carbon graphite composite. Of course, it will be apparent to those skilled in the art from this disclose that shoe sole portion 18A could be constructed of a flexible, resilient material.

Inner surface 30A of sole portion 18A faces upwardly towards the foot of the cyclist and has inner sole or cushion 20, which can be one or more layers, overlying inner surface 30A. Outer surface 32A of sole portion 18A faces downwardly for engaging pedal 14. inner and outer surfaces 30A and 32A of shoe sole portion 18A has a typical outer peripheral shoe sole shape which basically conforms to the outer shape of a cyclist's foot. Moreover, sole portion 18A is a concaved contour as viewed from inner surface 30A, with a further depression 49A formed longitudinally therealong.

Sole portion 18A has a longitudinally extending center line C which extends from a first center point of toe portion 34A to a second center point of heel portion 36A. In other words, center line C substantially bisects the front curve of toe portion 34A and substantially bisects the rear curve of heel port-ion 36A.

Attachment apertures 42A are spaced laterally from longitudinal center line C and extends substantially parallel thereto. More specifically, second attachment apertures 42A are spaced laterally towards the outside edge of bicycle shoe 10, and are in the form of elongated slots. Preferably, second attachment apertures 42A have their center lines spaced approximately 12.0 millimeters from the longitudinal center line C. Preferably, attachment apertures 42A extend approximately 21.3 millimeters in longitudinal length. Preferably, attachment apertures; or slots 42A have their center points spaced approximately 32.0 millimeters to approximately 34.0 millimeters (preferably approximately 33.5 millimeters) apart from each other, and substantially the same transverse width.

As mentioned above, the basic difference between the first embodiment and the sole portion 18A of the second embodiment is that sole portion 18A utilizes only a pair of attachment apertures 42A which are longitudinally aligned. In other words, attachment aperture 42 of sole portion 18 of the first embodiment has been divided into two separate attachment apertures 42A and the first attachment aperture 40 has been eliminated. Accordingly, sole portion 18A is designed to be exclusively utilized with a low profile cleat such as cleat 52.

In this embodiment, cleat attachment member 50A (depicted in broken lines) only has a curved plate or fixing portion with a pair of threaded holes or cleat nuts 62A and 64A which are aligned with attachment apertures 42A. Preferably, portions of cleat nuts 62A and 64A extend into attachment apertures 42A. Of course, cleat nuts 62A and 64A can be replaced with unthreaded holes such that fasteners can be threaded into the cleat. The centers of cleat nuts are spaced approximately 32.0 millimeters to approximately 34.0 millimeters (preferably approximately 33.5 millimeters) apart such that when cleat 52 is attached thereto by fasteners 56, the pedal shaft 23 of pedal 14 is located between cleat nuts.

Third Embodiment

Figure 22:
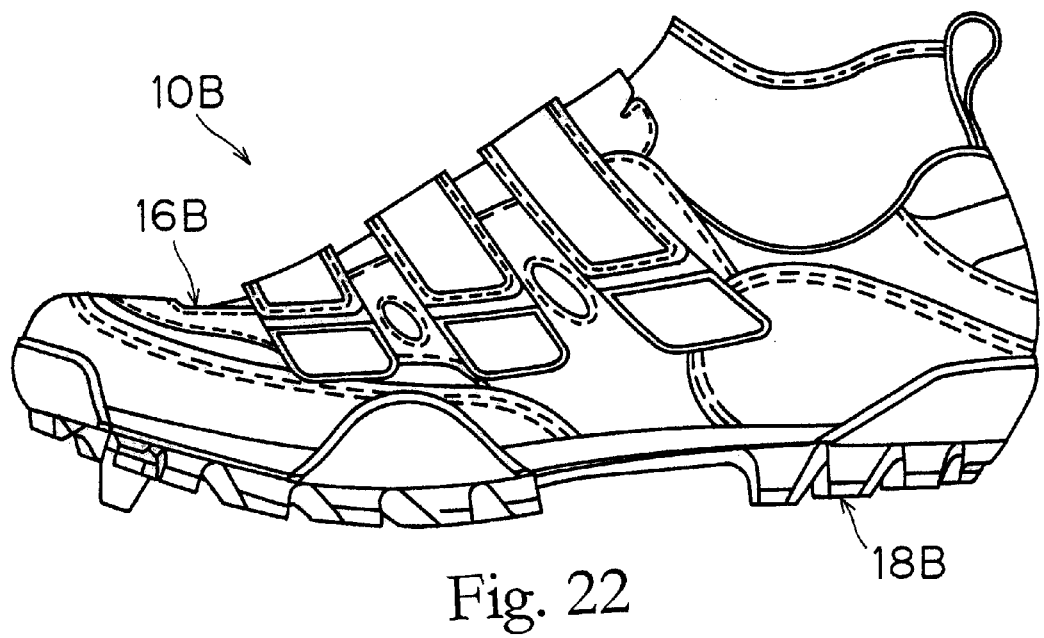
FIG. 22 is an outside elevational view of a left bicycle shoe in accordance with a third embodiment of the present invention.
Figure 23:
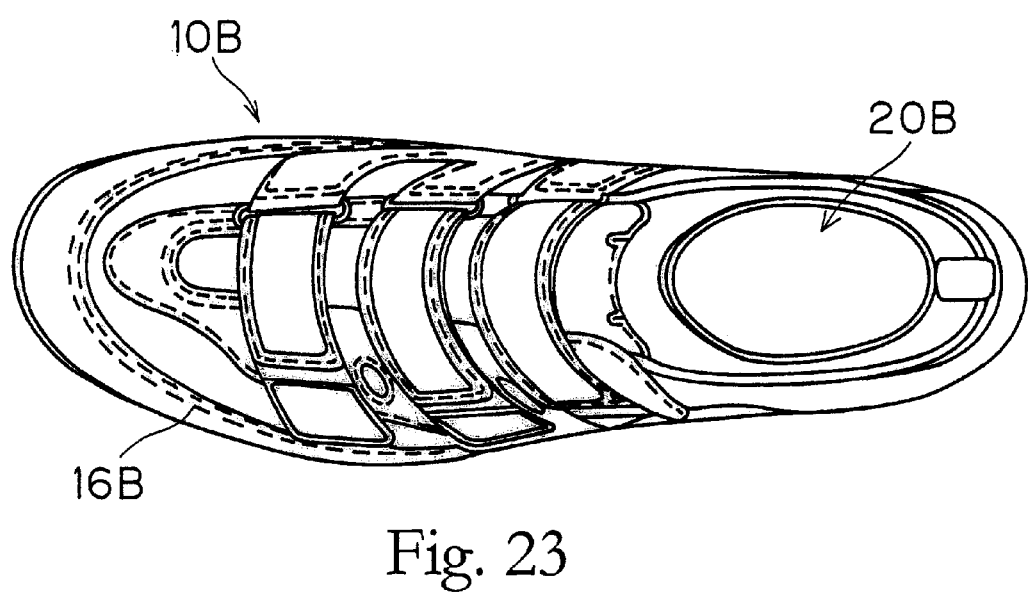
FIG. 23 is a top plan view of the left bicycle shoe illustrated in FIG. 22 in accordance with the third embodiment of the present invention.
Figure 24:
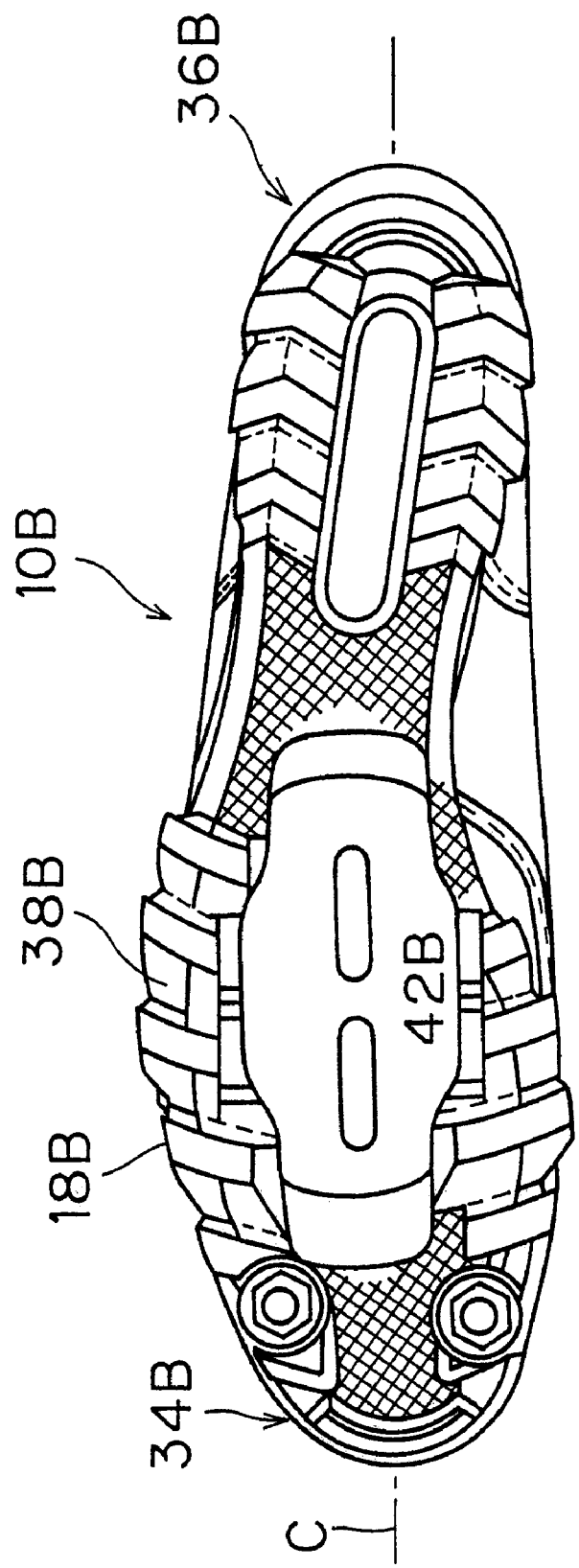
FIG. 24 is a bottom plan view of the left bicycle shoe illustrated in FIGS. 22–23 in accordance with the third embodiment of the present invention.

Referring now to FIGS. 22–24, a left bicycle shoe 10B in accordance with a third embodiment of the present invention is illustrated. Basically, bicycle shoe 10B is a bicycle shoe which is specifically designed for mountain bikes. More specifically, in this embodiment, the sole portion 18B is constructed of a flexible, resilient material which is typically utilized in mountain bike type bicycle shoes.

Bicycle shoe 10B has an upper peripheral portion 16B, a shoe sole portion 18B fixedly coupled to upper peripheral portion 16B and an inner sole or cushion 20B overlying shoe sole portion 18*b*. The precise construction of upper peripheral portion 16B, shoe sole portion 18B and inner sole 20B will not be discussed or illustrated in detail herein, since the basic construction of a bicycle shoe is old and well-known in the prior art. Moreover, it should be apparent to those skilled in the art that the present invention should not be limited to the precise construction of the non-claimed portion of bicycle shoe 10B as discussed and illustrated herein.

Sole portion 18B includes a pair of attachment apertures 42B. Basically, sole 18B is substantially identical to sole portion 18A, discussed above, except that this is a mountain bike version instead of a road bike version. Shoe sole portion 18B has a toe portion 3413, a heel portion 36B and a ball section 38B. Preferably, shoe sole portion 18B is constructed of any conventional shoe sole material which is known to be used in making bicycle shoes. Shoe sole portion 18B, in this embodiment, is constructed of a substantially flexible, resilient material such as those used within the art.

Sole portion 18B has a longitudinally extending center line C which extends from a first center point of toe portion 34B to a second center point of heel portion 36B. In other words, center line C substantially bisects the front curve of toe portion 34B and substantially bisects the rear curve of heel portion 36B.

Attachment apertures 42B are spaced laterally from longitudinal center line C and extends substantially parallel thereto. More specifically, second attachment apertures 42B are spaced laterally towards the outside edge of bicycle shoe 10B, and are in the form of elongated slots. Preferably, second attachment apertures 42B have their center lines spaced approximately 12.0 millimeters from the longitudinal center line C. Preferably, attachment apertures 42B extend approximately 21.3 millimeters in longitudinal length.

Fourth Embodiment

Figure 24A:
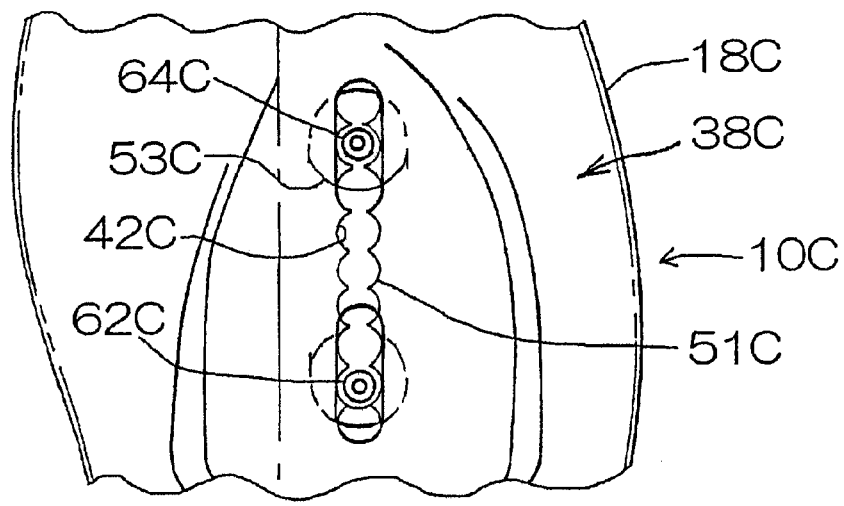
FIG. 24A is a partial inside elevational view of a sole portion for a right bicycle shoe in accordance with a fourth embodiment of the present invention.

Referring now to FIG. 24A, a part of a bicycle shoe 10C and a two piece, cleat attachment member in accordance with a fourth embodiment of the present invention are illustrated. The cleat attachment member of this embodiment is formed by a pair of separate cleat fixing portions 51C and 53C. Cleat fixing portions 51C and 53C have first and second cleat nuts 62C and 64C for coupling cleat 52 thereto via a pair of threaded fasteners in substantially the same manner as discussed above.

Sole portion 18C has an elongated attachment aperture or slot 42C which receives cleat nuts 62C and 64C therein. Slot 42C is longitudinally arranged between the toe and heel portions of sole portion 18C, and has a longitudinal length of at least approximately 32.0 millimeters to approximately 34.0 millimeters (preferably at least approximately 33.5 millimeters) such that when cleat 52 is attached thereto by fasteners, the pedal shaft 23 of pedal 14 is located between cleat nuts 62C and 64C. Slot 42C has a plurality of opposed curved sections which are sized to engage cleat nuts 62C and 64C. The opposed curved sections of slot 42C are sized to engage cleat nuts 62C and 64C for retaining them within slot 42C to prevent longitudinal movement of fixing portions 51C and 53C from moving within slot 42C.

Fifth Embodiment

Figure 24B:
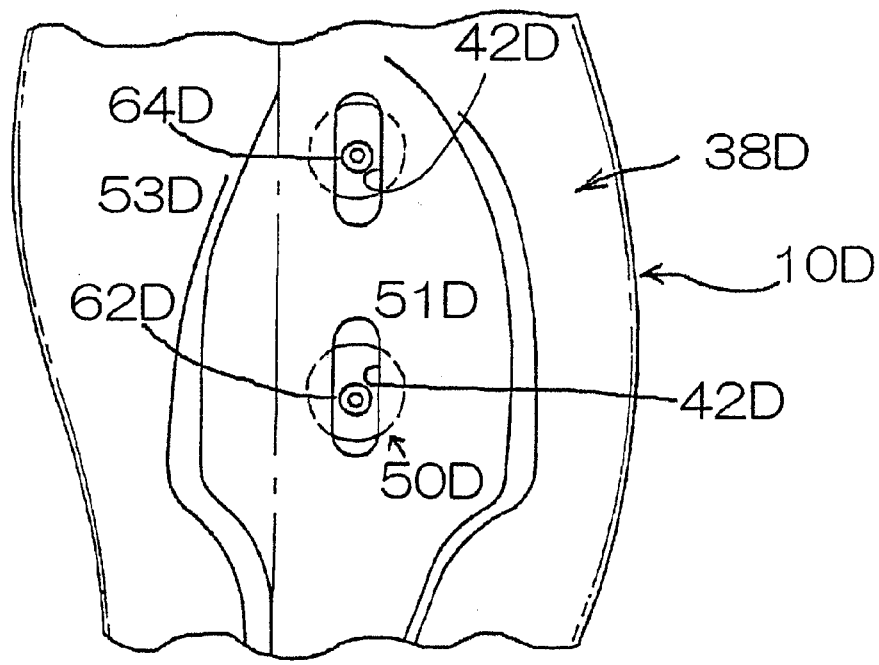
FIG. 24B is a partial inside elevational view of a sole portion for a right bicycle shoe in accordance with a fifth embodiment of the present invention.
Figure 25:
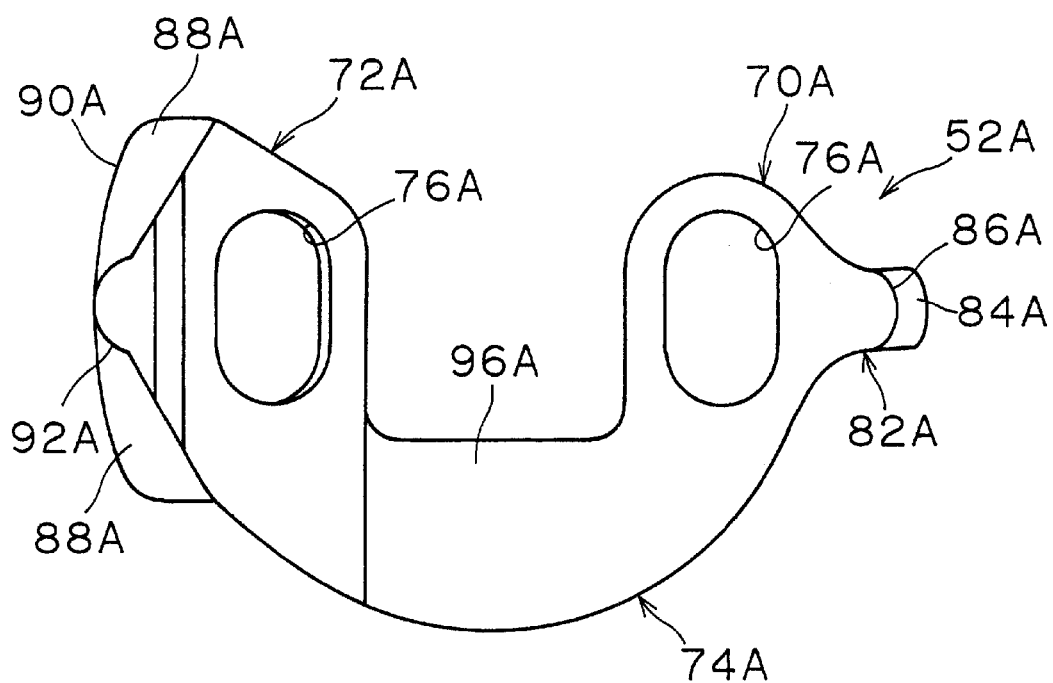
FIG. 25 is a top plan view of a modified cleat which can be utilized in connection with the bicycle shoes illustrated in the first, second or third embodiments of the present invention.
Figure 26:
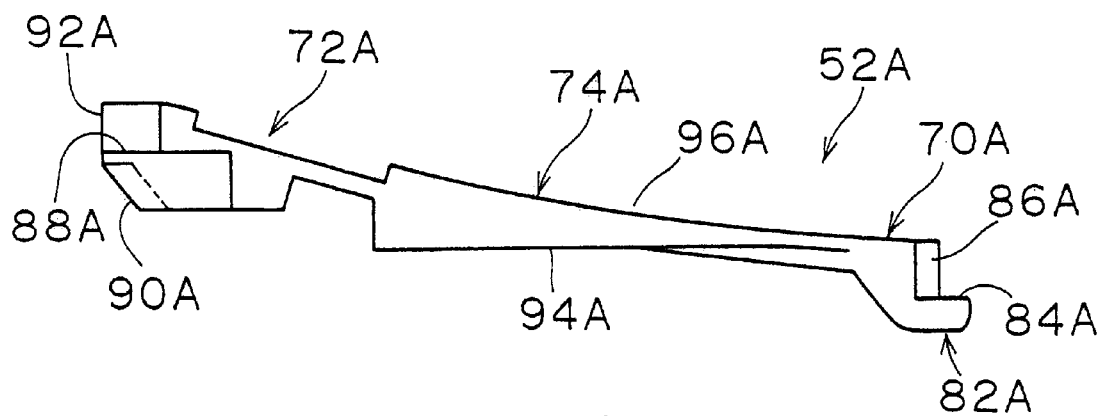
FIG. 26 is a side elevational view of the cleat illustrated in FIG. 25 for use with the bicycle shoes of the first, second or third embodiments of the present invention.
Figure 27:
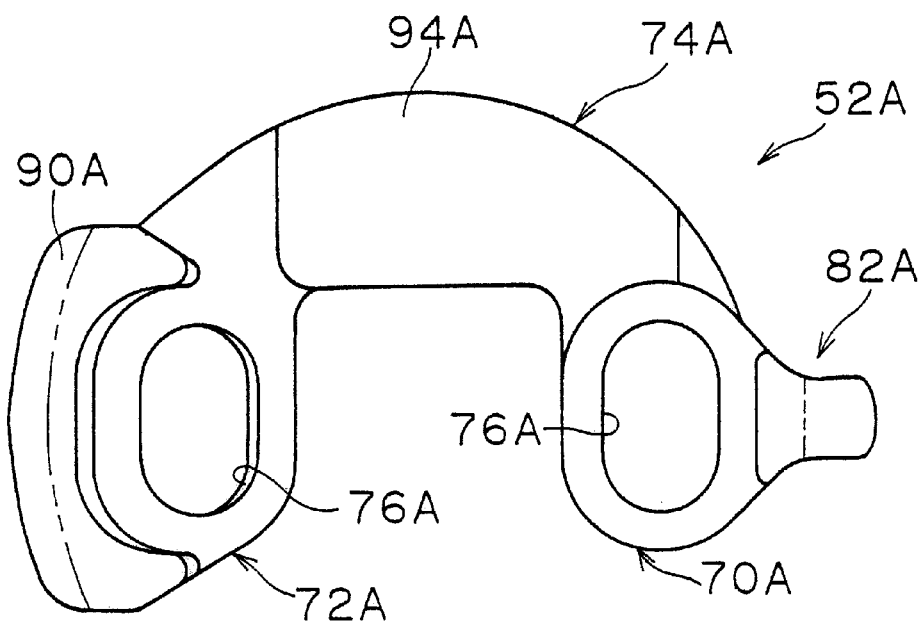
FIG. 27 is a bottom plan view of the cleat illustrated in FIGS. 25 and 26 for use with the bicycle shoes of the first, second or third embodiments of the present invention.
Figure 28:
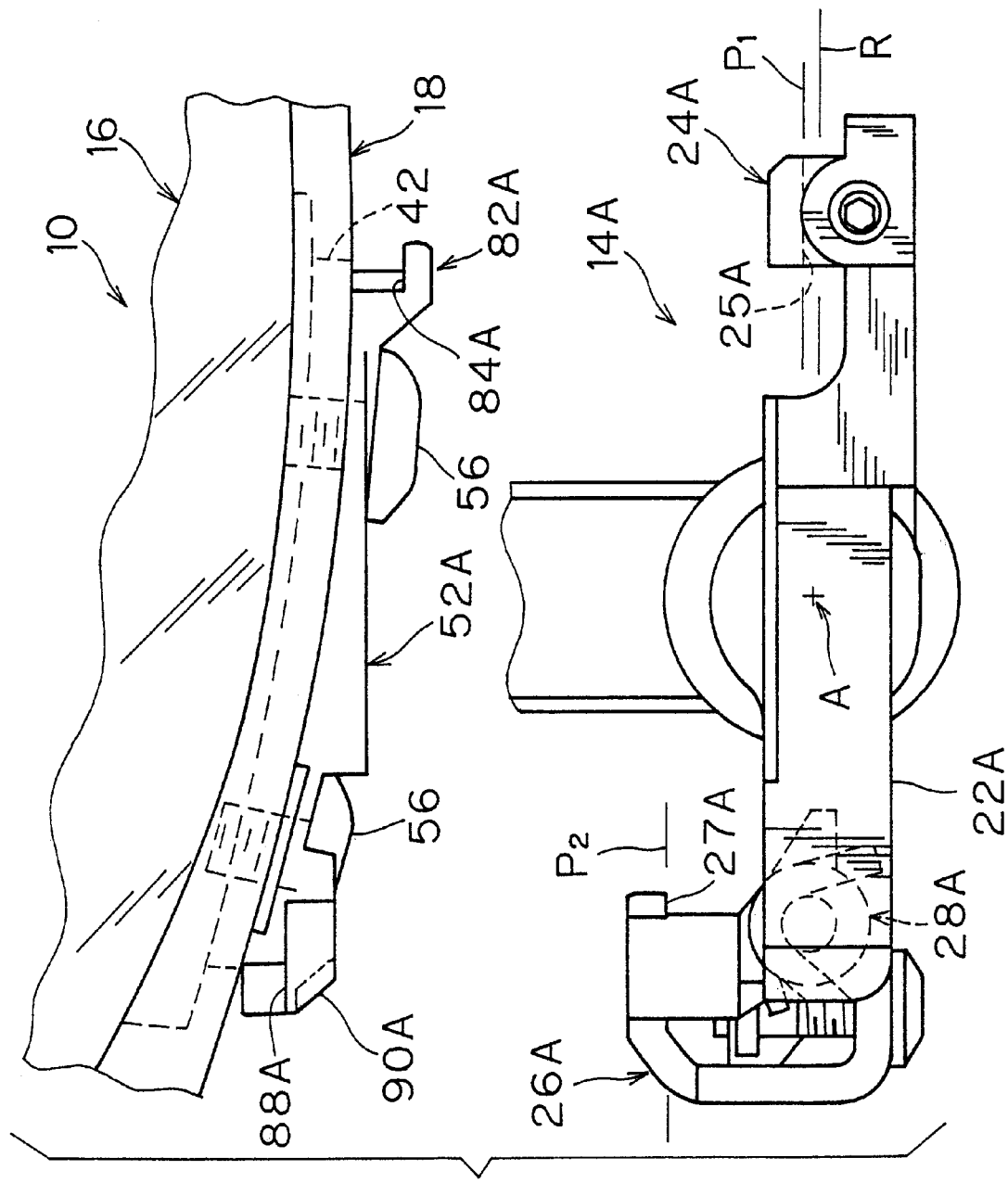
FIG. 28 is a partially, exploded outside elevational view of a low profile bicycle pedal used in conjunction with the cleat illustrated in FIGS. 25–27 which is coupled to a right bicycle shoe in accordance with the present invention.
Figure 29:
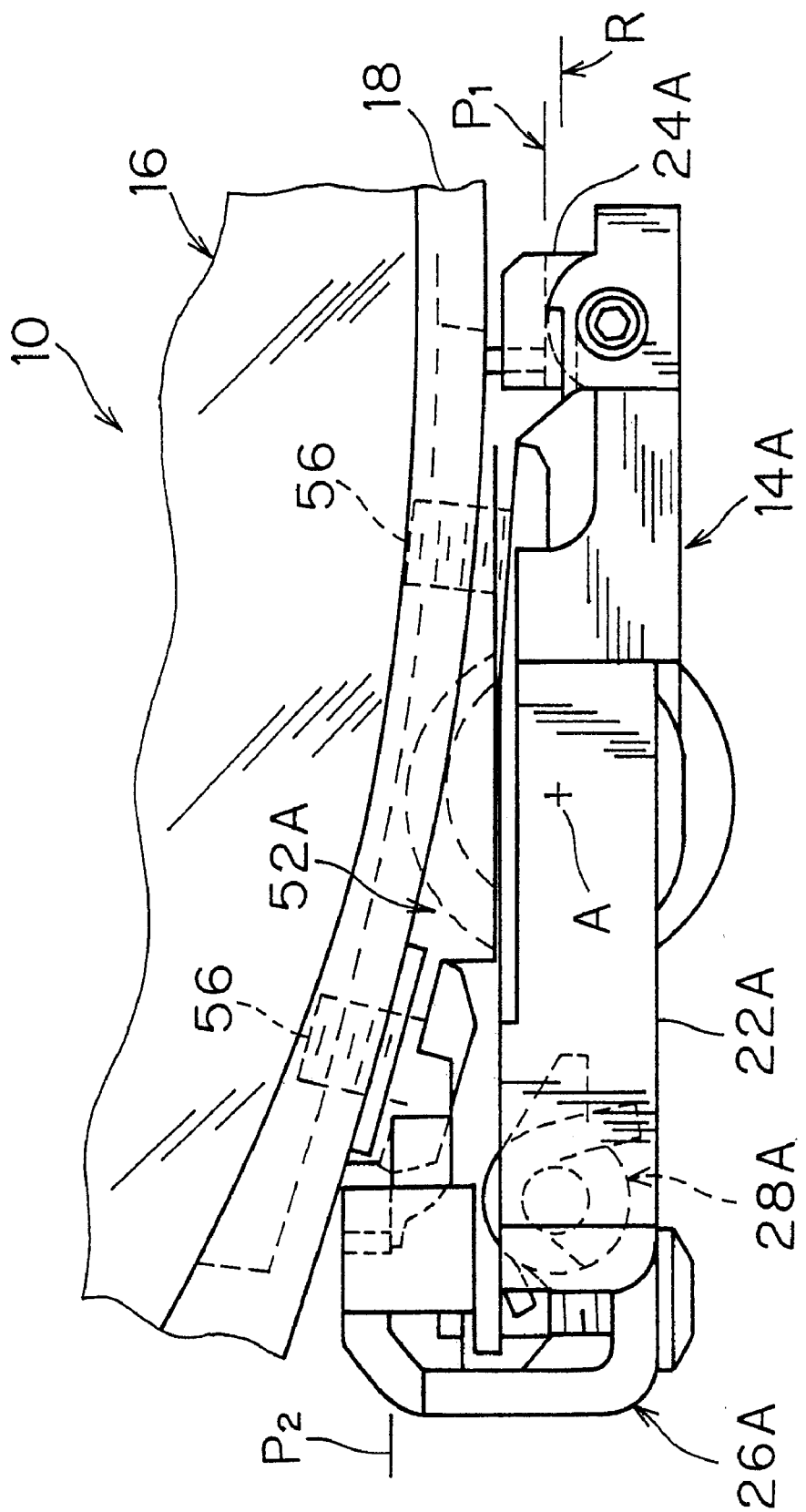
FIG. 29 is an outside elevational view of the bicycle shoe with the low profile bicycle pedal and cleat assembly illustrated in FIG. 28, after the cleat of FIGS. 25–27 has been clipped into the bicycle pedal.
Figure 30:
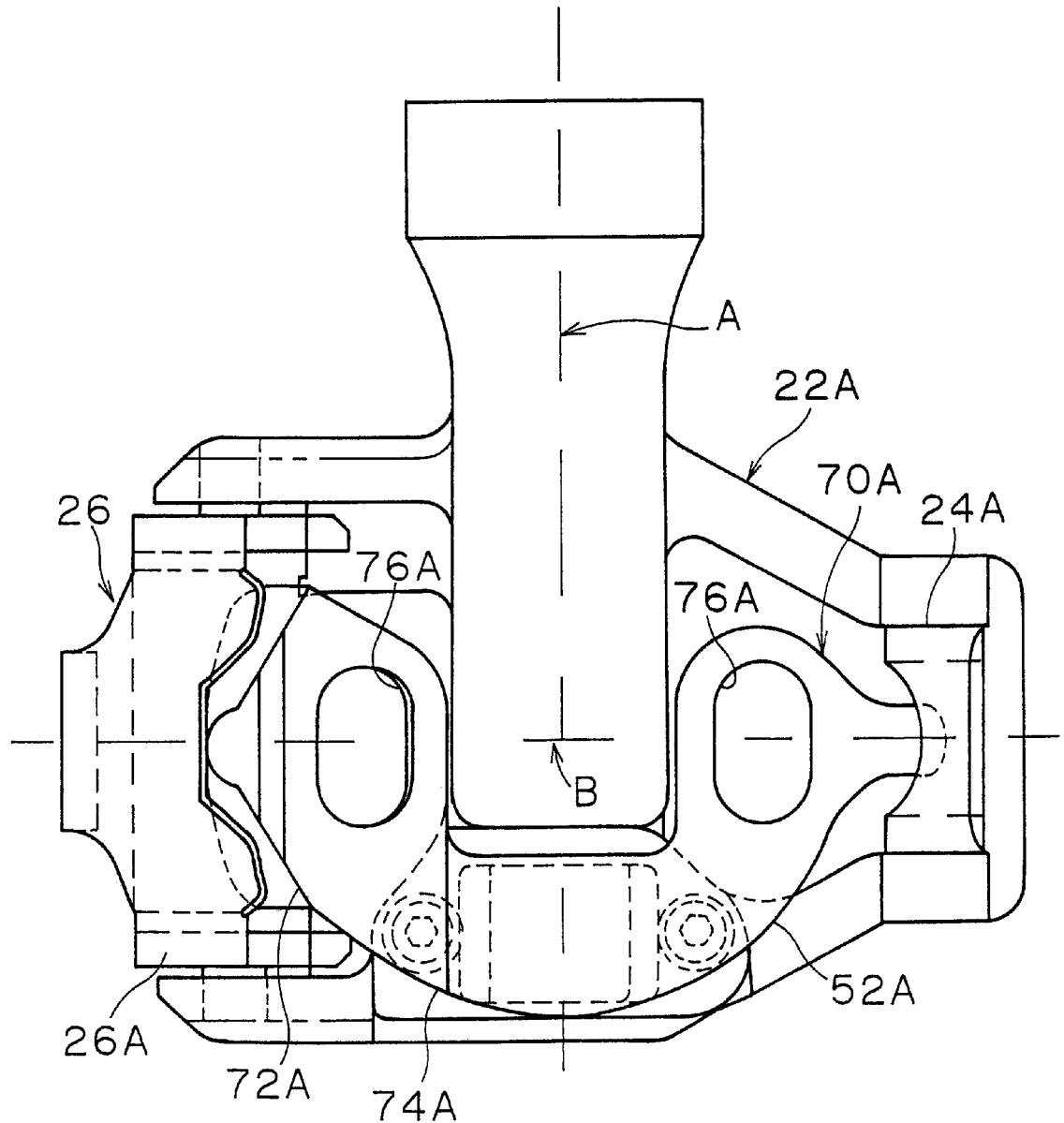
FIG. 30 is a top plan view of the low profile bicycle pedal with the cleat coupled thereto as illustrated in FIGS. 28 and 29.

Referring now to FIG. 24B, a part of a bicycle shoe 10D and a two piece, cleat attachment member in accordance with a fourth embodiment of the present invention are illustrated. The cleat attachment member of this embodiment is formed by a pair of separate cleat fixing portions 51D and 53D. Cleat fixing portions 51D and 53D have first and second cleat nuts 62D and 64D for coupling cleat 52 thereto via a pair of threaded fasteners in substantially the same manner as discussed above.

Sole portion 18D has a pair of elongated attachment apertures or slots 42D which receives cleat nuts 62D and 64D therein. Slots 42D are longitudinally arranged between the toe and heel portions of sole portion 18D. Slots 42D are substantially identical to slots 42A discussed above, such that when cleat 52 is attached thereto by fasteners, the pedal shaft 23 of pedal 14 is located between cleat nuts 62D and 64D.

Modified Cleat and Pedal

Referring now to FIGS. 25–30, a modified cleat 52A in accordance with the present invention is illustrated to be used with the modified pedal 14A. This cleat and pedal is fully described and illustrated in co-pending U.S. patent application Ser. No. 08/704,015, filed on Aug. 26, 1996, which has been incorporated herein by reference. Basically, fasteners 54 can be utilized to attach cleat 52A to either sole portion 18, 18A or 18B in substantially the same manner as discussed above with respect to cleat 52. Accordingly, cleat 52A and pedal 14A will not be discussed or illustrated in detail herein.

Basically, cleat 52A has a front attachment portion 70A for engaging front clamping member 24A of pedal 14A, a rear attachment portion 72A for engaging and moving rear clamping member 26A, and a center or connecting portion 74A extending between front attachment portion 70A and rear attachment portion 72A. Preferably, front and rear attachment portions 70A and 72A, together with center portion 74A are integrally formed together as a one-piece, unitary member which is constructed from a suitable rigid material.

Front attachment portion 70A and rear attachment portion 72A each has a hole or slot 76A for receiving one of the fasteners 56 therethrough for coupling cleat 52A to sole portion 18 of the bicycle shoe 10 in a relatively conventional manner. This interconnection of cleat 52A to sole portion 18 is relatively well-known in the art, and thus, this interconnection will not be discussed or illustrated in detail herein.

Front attachment portion 70A has a nose portion 82A for engaging front clamping member 24A of pedal 14A. Nose portion 82A has a front coupling surface 84A and a curved stop surface 86A formed thereon. Front coupling surface 84A is preferably a substantially flat, planar surface which is designed to engage front cleat engaging surface 25A of front clamping member 24A. Curved stop surface 86A is designed to engage a cutout portion of front clamping member 24A to prevent forward movement of cleat 54A relative to the pedal body 22A. Curved stop surface 86A engages front clamping member 24A to form a pivot point for pivotally releasing cleat 52A from pedal body 22A.

Rear attachment portion 72A has a pair of rear coupling surfaces 88A for engaging rear cleat engaging surface 27A of rear clamping member 26A to secure cleat 52A to pedal body 22A via rear clamping member 26A. Rear coupling surfaces 88A are preferably substantially flat, planar surfaces which are substantially parallel to front coupling surface 84A of cleat 52A. Rear attachment portion 72A also has a curved or angled cam surface 90A which is designed to engage rear clamping member 26A during coupling of cleat 52A to pedal body 22A. In particular, cam surface 90A is designed to rotate rear clamping member 26A rearwardly from its normal cleat engaging position to its cleat releasing position during downward movement of cleat 52A relative to pedal body 22A. Rear attachment portion 72A also has a curved stop surface 92A for engaging rear clamping member 26A to prevent rearward movement of cleat 52A relative to pedal body 22A when coupled thereto.

Center portion 74A has a substantially planar bottom surface 94A which is designed to engage a cleat supporting surface of pedal 14A. The upper surface 96A of center portion 74A is designed to engage outer surface 32 of sole portion 18.

While several embodiments have been chosen to illustrate the present invention, it will be understood by those skilled in the art that various changes and modifications can be made herein without departing from the scope of the invention as defined in the appended claims.

What is claimed is:

1. As bicycle shoe adapted to fixedly receive a cleat thereto for use with a low profile bicycle pedal, comprising:

a shoe sole portion having an inner surface facing the foot of the cyclist, an outer surface facing the pedal, a toe portion, a heel portion longitudinally spaced from said toe portion and a ball section located between said toe portion and said heel portion with first and second elongated attachment slots formed in said ball section which are substantially longitudinally aligned in a substantially longitudinal direction between said toe portion and said heel portion, said first and second elongated attachment slots having first and second center points that are spaced approximately 32.0 millimeters to approximately 34.0 millimeters apart from each other.

2. A bicycle shoe according to claim 1, wherein
   said first and second slots have first and second longitudinal lengths which are substantially the same.

3. A bicycle shoe according to claim 2, wherein
   said first and second center points are longitudinally spaced approximately 33.5 millimeters apart from each other.

4. A bicycle shoe according to claim 1, wherein
   said first and second slots have substantially the same transverse width.

5. A bicycle shoe according to claim 1, wherein
   said sole portion is constructed of substantially flexible, resilient material.

6. A bicycle shoe according to claim 1, wherein
   said sole portion is constructed of a substantially hard, rigid material.

7. A bicycle shoe according to claim 6, wherein
   said rigid material of said sole portion is made of carbon graphite.

8. A bicycle shoe adapted to fixedly receive a cleat thereto for use with a low profile bicycle pedal, comprising:

a shoe sole portion having an inner surface facing the foot of the cyclist, an outer surface facing the pedal, a toe portion, a heel portion longitudinally spaced from said toe portion and a ball section located between said toe portion and said heel portion with first and second elongated attachment slots formed in said ball section which are substantially longitudinally aligned in a substantially longitudinal direction between said toe portion and said heel portion, said first and second slots having first and second longitudinal lengths which are substantially the same and first and second center points which are longitudinally spaced approximately 33.5 millimeters apart from each other; and first and second cleat fixing portions overlying said inner surface of said sole portion, said first fixing portion overlying said first aperture to fixedly couple the cleat to said outer surface of said sole portion and said second fixing portion overlying said second aperture to fixedly couple the cleat to said outer surface of said sole portion.

9. A bicycle shoe according to claim 8, wherein
   said first fixing portion has first hole aligned with said first slot and said second fixing portion has a second hole aligned with said second slot, to receive fasteners therethrough.

10. A bicycle shoe according to claim 9, wherein
    said first and second holes are threaded.

11. A bicycle shoe according to claim 9, wherein
    said first and second holes have their center axes spaced approximately 33.5 millimeters apart from each other.

12. A bicycle shoe according to claim 9, wherein
    said first and second holes have first and second center axes which are longitudinally spaced approximately 32.0 millimeters to approximately 34.0 millimeters apart from each other.

13. A bicycle shoe according to claim 8, wherein
    said first and second slots have substantially the same transverse width.

14. A bicycle shoe according to claim 8, wherein
    said sole portion is constructed of substantially flexible, resilient material.

15. A bicycle shoe according to claim 8, wherein
    said sole portion is constructed of a substantially hard, rigid material.

16. A bicycle shoe according to claim 15, wherein
    said rigid material of said sole portion is made of carbon graphite.

17. A bicycle shoe according to claim 8, wherein
    said first and second cleat fixing portions are connected by a base portion.

18. A bicycle shoe according to claim 17, wherein
    said base portion is a curved plate.

19. A bicycle shoe according to claim 8, wherein
    each of said first and second cleat fixing portions has a separate base portion such that said first and second cleat fixing portions are independently movable relative to each other.

* * * * *